United States Patent
Yamasaki et al.

(10) Patent No.: US 9,481,349 B2
(45) Date of Patent: Nov. 1, 2016

(54) VEHICLE BRAKE DEVICE

(75) Inventors: Tsuyoshi Yamasaki, Toyota (JP); Masayasu Ohkubo, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/390,588

(22) PCT Filed: Apr. 5, 2012

(86) PCT No.: PCT/JP2012/059344
§ 371 (c)(1),
(2), (4) Date: Oct. 3, 2014

(87) PCT Pub. No.: WO2013/150632
PCT Pub. Date: Oct. 10, 2013

(65) Prior Publication Data
US 2015/0091369 A1    Apr. 2, 2015

(51) Int. Cl.
*B60T 13/68*    (2006.01)
*B60T 8/40*    (2006.01)
(Continued)

(52) U.S. Cl.
CPC .............. *B60T 13/686* (2013.01); *B60T 7/042* (2013.01); *B60T 8/4081* (2013.01); *B60T 8/5012* (2013.01); *B60T 13/142* (2013.01); *B60T 13/586* (2013.01);
(Continued)

(58) Field of Classification Search
CPC .... B60T 7/042; B60T 8/4081; B60T 8/5012; B60T 8/94; B60T 13/142; B60T 13/586; B60T 13/662; B60T 13/686; B60T 17/22
See application file for complete search history.

(56) References Cited

U.S. PATENT DOCUMENTS

| 4,789,938 A | * | 12/1988 | Maehata | B60T 8/94 303/122.05 |
| 5,984,432 A | * | 11/1999 | Otomo | B60T 7/042 303/113.1 |

(Continued)

FOREIGN PATENT DOCUMENTS

| JP | 2009-61816 | 3/2009 |
| JP | 2011-156998 | 8/2011 |

(Continued)

OTHER PUBLICATIONS

International Search Report issued Jul. 10, 2012, in PCT/JP12/59344 filed Apr. 5, 2012.

*Primary Examiner* — Thomas Irvin
(74) *Attorney, Agent, or Firm* — Oblon, McClelland, Maier & Neustadt, L.L.P.

(57) ABSTRACT

A brake ECU uses a control pressure acquired from a control pressure sensor to determine whether a valve closing operation abnormality or a valve opening operation abnormality occurs in one of a pressure increasing linear control valve and an adjusted flow rate cut valve in a state where a hydraulic pressure is supplied from an accumulator. The brake ECU controls, if the brake ECU determines that an abnormality occurs, respectively the control valve and the cut valve to change to an open state or a closed state, and identifies, based on a change in the control pressure acquired from the control pressure sensor, in which of the control valve and the cut valve the valve opening operation abnormality or the valve closing operation abnormality occurs. The brake ECU can use, after a valve in which the valve opening operation abnormality or the valve closing operation abnormality occurs is identified, a valve in which the abnormality does not occur to carry out brake control.

4 Claims, 16 Drawing Sheets

(51) Int. Cl.
   *B60T 8/50*   (2006.01)
   *B60T 13/14*  (2006.01)
   *B60T 7/04*   (2006.01)
   *B60T 13/58*  (2006.01)
   *B60T 13/66*  (2006.01)
   *B60T 8/94*       (2006.01)
   *B60T 17/22*      (2006.01)

(52) U.S. Cl.
   CPC .............. *B60T 13/662* (2013.01); *B60T 8/94* (2013.01); *B60T 17/22* (2013.01)

(56) References Cited

U.S. PATENT DOCUMENTS

| | | | | |
|---|---|---|---|---|
| 7,540,572 B2 * | 6/2009 | Nakamura | ............... | B60T 8/36 303/119.2 |
| 8,007,056 B2 * | 8/2011 | Ohkubo | ............... | B60T 8/4081 303/122 |
| 8,506,022 B2 * | 8/2013 | Nakaoka | ............... | B60T 8/3275 303/115.4 |
| 8,870,301 B2 * | 10/2014 | Ohkubo | ............... | B60T 8/3655 303/116.1 |
| 9,132,817 B2 * | 9/2015 | Ohkubo | ............... | B60T 8/3655 |
| 2007/0108837 A1 * | 5/2007 | Ohkubo | ............... | B60T 8/4081 303/122.08 |
| 2007/0176486 A1 * | 8/2007 | Nakamura | ............ | B60K 6/365 303/115.1 |
| 2009/0302675 A1 | 12/2009 | Nakaoka et al. | | |
| 2015/0091370 A1 * | 4/2015 | Yamasaki | ............... | B60T 7/042 303/11 |
| 2015/0166029 A1 * | 6/2015 | Yamasaki | ................ | B60T 8/48 303/14 |

FOREIGN PATENT DOCUMENTS

| | | | | |
|---|---|---|---|---|
| JP | 2011-156999 | | 8/2011 | |
| WO | WO 2012/035652 A1 * | | 3/2012 | ............... B60T 1/10 |

* cited by examiner

VEHICLE BRAKE DEVICE

TECHNICAL FIELD

The present invention relates to a vehicle brake device including a pressurizing pump and a linear control valve, and being configured to set a target hydraulic pressure for wheel cylinders corresponding to a hydraulic pressure that is generated in a master cylinder in response to a stepping operation by a driver on a brake pedal, and drive the linear control valve, thereby supplying the hydraulic pressure increased by the pressurizing pump so that the hydraulic pressure follows the set target hydraulic pressure for the wheel cylinders.

BACKGROUND ART

Hitherto, as the vehicle brake device of this type, a brake control device disclosed in, for example, Patent Literature 1 has been known. The related-art brake control device includes a plurality of wheel cylinders for receiving supply of a working fluid, thereby applying braking forces to each of a plurality of wheels, a plurality of holding valves provided upstream of the respective wheel cylinders, for holding hydraulic pressures in the plurality of wheel cylinders, a pair of adjustment control valves provided upstream of the plurality of holding valves, for controlling upstream pressures of the plurality of holding valves in common, and a control part for switching between a pressure adjustment mode of using, if a deviation of the upstream pressure from a target pressure is out of a set range, the pressure adjustment control valves to control the upstream pressure to follow the target pressure, and a holding mode selected if the deviation falls within the set range, thereby controlling the upstream pressure.

Moreover, hitherto, as the brake device of this type, brake systems disclosed in Patent Literatures 2 and 3 have also been known. Those related-art brake systems each include hydraulic pressure brakes provided respectively for a plurality of wheels of a vehicle and operated by a hydraulic pressure of brake cylinders, thereby restraining the wheels from rotating, a power hydraulic pressure source for generating a hydraulic pressure by a supply of electric energy, a common passage connected to the power hydraulic pressure source and connected to the plurality of brake cylinders of the hydraulic brakes, an output hydraulic pressure control valve provided on a control pressure passage for connecting the common passage and the power hydraulic pressure source to each other and configured to control an output hydraulic pressure of the power hydraulic pressure source, thereby supplying the common passage with the hydraulic pressure, and a brake hydraulic pressure control device for controlling the output hydraulic pressure control valve to control the hydraulic pressure in the common passage, thereby controlling the hydraulic pressure of the plurality of brake cylinders.

CITATION LIST

Patent Literature

[PTL 1] JP 2009-61816 A
[PTL 2] JP 2011-156998 A
[PTL 3] JP 2011-156999 A

SUMMARY OF INVENTION

By the way, in the related-art brake control device and brake systems, the working fluid pressurized by the pressurizing pump and the working fluid supplied from the power hydraulic pressure source are supplied to the wheel cylinders or the brake cylinders via the pressure adjustment control valve or the output hydraulic pressure control valve including a pressure increasing linear control valve and a pressure decreasing linear control valve. In this case, for example, if an operation abnormality occurs in the pressure increasing linear control valve, the working fluid pressurized by the pressurizing pump or the working fluid supplied from the power hydraulic pressure source is not supplied to the wheel cylinders or the brake cylinders. In preparation for this situation, a hydraulic pressure generated in the master cylinder in response to a stepping operation by a driver on a brake pedal is transmitted to the wheel cylinders or the brake cylinders. However, in this case, if the hydraulic pressure supplied from the master cylinder in response to the operation by the driver on the brake pedal decreases, the braking forces generated on the wheels may decrease.

Therefore, for example, in order to supply the wheel cylinders or the brake cylinders with the working fluid pressurized by the pressurizing pump or the working fluid supplied from the power hydraulic pressure source even if the operation abnormality occurs in the pressure increasing linear control valve, or in order to secure a high flow rate of the working fluid for emergency braking, a compact electromagnetic on-off valve may be provided in parallel to the pressure increasing linear control valve. However, if the pressure increasing linear control valve and the electromagnetic on-off valve are arranged in parallel to each other, the brake control may be changed due to an operation abnormality occurring in those valves. It is thus extremely important to appropriately determine on which valve the operation abnormality occurs.

The present invention has been made in view of the above-mentioned problem, and therefore has an object to provide a vehicle brake device capable of identifying an operation abnormality occurring in any one of the pressure increasing linear control valve and the electromagnetic on-off valve, which are arranged in parallel to each other downstream of the power hydraulic pressure source and used for the pressure increasing control, and capable of generating appropriate braking forces depending on the occurring operation abnormality.

In order to achieve the object, a vehicle brake device according to one embodiment of the present invention includes a wheel cylinder, a master cylinder, a power hydraulic pressure source, a pressure adjustment control valve, first hydraulic pressure detection means, second hydraulic pressure detection means, third hydraulic pressure detection means, and control means.

The wheel cylinder is configured to receive a hydraulic pressure of a working fluid and apply a braking force to a wheel. The master cylinder is configured to introduce therein a servo pressure generated in response to an operation by a driver on a brake pedal, thereby generating a hydraulic pressure. The power hydraulic pressure source is configured to generate a hydraulic pressure by drive of a pressurizing pump. The pressure adjustment control valve is configured to adjust the hydraulic pressure transmitted from the power hydraulic pressure source to the wheel cylinder. The first hydraulic pressure detection means is configured to detect the hydraulic pressure output from the power hydraulic pressure source. The second hydraulic pressure detection means is configured to detect the hydraulic pressure output from the master cylinder. The third hydraulic pressure detection means is configured to detect the hydraulic pressure in the wheel cylinder. The control means is configured to control drive of the power hydraulic pressure source and drive of the pressure adjustment control valve based on the hydraulic pressure output from the master cylinder and detected by the second hydraulic pressure detection means, and the hydraulic pressure transmitted to the wheel cylinder and detected by the third hydraulic pressure detection means.

One feature of the vehicle brake device according to one embodiment of the present invention resides in that: the pressure adjustment control valve includes: a pressure increasing linear control valve used for pressure increasing control of increasing the hydraulic pressure transmitted from the power hydraulic pressure source to the wheel cylinder; an electromagnetic on-off valve arranged in parallel to the pressure increasing linear control valve; and a pressure decreasing linear control valve used for pressure decreasing control of decreasing the hydraulic pressure transmitted from the power hydraulic pressure source to the wheel cylinder. Further, the control means is configured to: use, when a magnitude of the hydraulic pressure detected by the first hydraulic pressure detection means is a predetermined magnitude, a magnitude of the hydraulic pressure detected by the third hydraulic pressure detection means to determine whether or not an operation abnormality occurs in one of the pressure increasing linear control valve and the electromagnetic on-off valve that construct the pressure adjustment control valve; control, when the control means determines that the operation abnormality occurs in one of the pressure increasing linear control valve and the electromagnetic on-off valve, respectively the pressure increasing linear control valve and the electromagnetic on-off valve to change from a closed state to an open state or from the open state to the closed state; and identify, based on a change in the hydraulic pressure generated in response to the change control and detected by the third hydraulic pressure detection means, in which of the pressure increasing linear control valve and the electromagnetic on-off valve the operation abnormality occurs.

In this case, the servo pressure to be introduced into the master cylinder may be supplied from, for example, a pressure increasing mechanism that is configured to mechanically move by the hydraulic pressure output from the master cylinder in response to the operation by the driver on the brake pedal, to thereby generate a hydraulic pressure having a predetermined ratio with respect to the hydraulic pressure output from the master cylinder. Further, in this case, in the master cylinder, for example, a piston rod for coupling a pressurizing piston for pressurizing the stored working fluid and the brake pedal to each other may be divided, and the piston rod may include: a first piston rod connected to the brake pedal at one end; a second piston rod connected to the pressurizing piston at one end; and an elastic body for coupling another end of the first piston rod and another end of the second piston rod to each other, and adjusting a stroke caused by the operation by the driver on the brake pedal. The servo pressure may be introduced from the pressure increasing mechanism to at least the pressurizing piston and the another end of the first piston rod.

Note that, in this case, the control means may include: operation abnormality determination means for using, when the magnitude of the hydraulic pressure detected by the first hydraulic pressure detection means is the predetermined magnitude, the magnitude of the hydraulic pressure detected by the third hydraulic pressure detection means to determine whether or not an operation abnormality occurs in one of the pressure increasing linear control valve and the electromagnetic on-off valve that construct the pressure adjustment control valve; change control means for controlling, when the operation abnormality determination means determines that the operation abnormality occurs in one of the pressure increasing linear control valve and the electromagnetic on-off valve, respectively the pressure increasing linear control valve and the electromagnetic on-off valve to change from the closed state to the open state or from the open state to the closed state; and identification means for identifying, based on the change in the hydraulic pressure generated in response to the change control by the change control means and detected by the third hydraulic pressure detection means, in which of the pressure increasing linear control valve and the electromagnetic on-off valve the operation abnormality occurs.

As a result, even in a case where the operation abnormality occurs in the pressure increasing linear control valve, when the working fluid supplied from the power hydraulic pressure source is supplied to the wheel cylinder, or when the electromagnetic on-off valve is arranged in parallel to the pressure increasing linear control valve for securing a high flow rate of the working fluid in an emergency braking to provide pressure increasing control, it can be determined whether or not the operation abnormality occurs in the pressure increasing linear control valve or the electromagnetic on-off valve can be determined based on a difference in change (specifically, a change of an increase in hydraulic pressure) of a hydraulic pressure detected by using at least a sensor (specifically, a control pressure sensor) corresponding to the third hydraulic pressure detection means among various sensors provided for the related-art vehicle brake device. Then, it is further possible to identify a valve in which the operation abnormality occurs out of the pressure increasing linear control valve and the electromagnetic on-off valve.

In this case, more specifically, the control means may be configured to: determine, in the case where the control means controls the pressure increasing linear control valve and the electromagnetic on-off valve to the closed state when the magnitude of the hydraulic pressure detected by the first hydraulic pressure detection means is the predetermined magnitude, and the magnitude of the hydraulic pressure detected by the third hydraulic pressure detection means increases, that a valve closing operation abnormality occurs in which the open state is maintained even when the change control of bringing one of the pressure increasing linear control valve and the electromagnetic on-off valve from the open state into the closed state is carried out; and determine, in the case where the control means controls the pressure increasing linear control valve and the electromagnetic on-off valve to the open state when the magnitude of the hydraulic pressure detected by the first hydraulic pressure detection means is the predetermined magnitude, and the magnitude of the hydraulic pressure detected by the third hydraulic pressure detection means is less than a magnitude of a target hydraulic pressure, that a valve opening operation abnormality occurs in which the closed state is maintained even when the change control of bringing one of the pressure increasing linear control valve and the electromagnetic on-off valve from the closed state into the open state is carried out.

As a result, it can be accurately identified whether an operation abnormality occurring in the pressure increasing linear control valve or the electromagnetic on-off valve is a valve closing operation abnormality in which the open state is maintained even when the change control of bringing one of the pressure increasing linear control valve and the electromagnetic on-off valve from the open state into the closed state is carried out, or a valve opening operation abnormality in which the closed state is maintained even when the change control of bringing one of the pressure increasing linear control valve and the electromagnetic on-off valve from the closed state into the open state is carried out.

Then, the control means may be configured to, when the control means determines that the valve closing operation abnormality occurs in one of the pressure increasing linear control valve and the electromagnetic on-off valve: control the pressure increasing linear control valve from the closed state to the open state, and control the electromagnetic on-off valve to the closed state; identify, in a case where the magnitude of the hydraulic pressure detected by the third hydraulic pressure detection means is a magnitude of the hydraulic pressure transmitted from the power hydraulic pressure source to the wheel cylinder when only the pressure increasing linear control valve is controlled to the open state, that the valve closing operation abnormality occurs in the pressure increasing linear control valve; and identify, in a case where the magnitude of the hydraulic pressure detected by the third hydraulic pressure detection means is larger than the magnitude of the hydraulic pressure transmitted from the power hydraulic pressure source to the wheel cylinder when only the pressure increasing linear control valve is controlled to the open state, that the valve closing operation abnormality occurs in the electromagnetic on-off valve.

Moreover, the control means may be configured to, when the control means determines that the valve closing operation abnormality occurs in one of the pressure increasing linear control valve and the electromagnetic on-off valve: control the electromagnetic on-off valve from the closed state to the open state, and control the pressure increasing linear control valve to the closed state; identify, in a case where the magnitude of the hydraulic pressure detected by the third hydraulic pressure detection means is a magnitude of the hydraulic pressure transmitted from the power hydraulic pressure source to the wheel cylinder when only the electromagnetic on-off valve is controlled to the open state, that the valve closing operation abnormality occurs in the electromagnetic on-off valve; and identify, in a case where the magnitude of the hydraulic pressure detected by the third hydraulic pressure detection means is larger than the magnitude of the hydraulic pressure transmitted from the power hydraulic pressure source to the wheel cylinder when only the electromagnetic on-off valve is controlled to the open state, that the valve closing operation abnormality occurs in the pressure increasing linear control valve.

As a result, when the valve closing operation abnormality occurs in one of the pressure increasing linear control valve and the electromagnetic on-off valve, after the respective valves are controlled to the open state, based on a change in the hydraulic pressure detected by the third hydraulic pressure detection means, the occurrence of the valve closing operation abnormality on the pressure increasing linear control valve can be accurately identified, and the occurrence of the valve closing operation abnormality on the electromagnetic on-off valve can be accurately identified.

Moreover, the control means may be configured to, when the control means determines that the valve opening operation abnormality occurs in one of the pressure increasing linear control valve and the electromagnetic on-off valve: control the pressure increasing linear control valve from the open state to the closed state, and control the electromagnetic on-off valve to the open state; and identify, when the magnitude of the hydraulic pressure detected by the third hydraulic pressure detection means changes from an increase tendency in response to the control of bringing the pressure increasing linear control valve into the closed state, that the valve opening operation abnormality occurs in the electromagnetic on-off valve.

Further, the control means may be configured to, when the control means determines that the valve opening operation abnormality occurs in one of the pressure increasing linear control valve and the electromagnetic on-off valve: control the electromagnetic on-off valve from the open state to the closed state, and control the pressure increasing linear control valve to the open state; and identify, when the magnitude of the hydraulic pressure detected by the third hydraulic pressure detection means changes from an increase tendency in response to the control of bringing the electromagnetic on-off valve into the closed state, that the valve opening operation abnormality occurs in the pressure increasing linear control valve.

As a result, when the valve opening operation abnormality occurs in one of the pressure increasing linear control valve and the electromagnetic on-off valve, after the respective valves are controlled to the closed state, based on a change tendency of the hydraulic pressure detected by the third hydraulic pressure detection means, the occurrence of the valve opening operation abnormality on the pressure increasing linear control valve can be accurately identified, and the occurrence of the valve opening operation abnormality on the electromagnetic on-off valve can be accurately identified.

Moreover, another feature of the vehicle brake device according to one embodiment of the present invention resides in that the control means is configured to: use, when a magnitude of the hydraulic pressure detected by the first hydraulic pressure detection means is a predetermined magnitude, a magnitude of the hydraulic pressure detected by the third hydraulic pressure detection means to determine whether or not an operation abnormality occurs in one of the pressure increasing linear control valve and the electromagnetic on-off valve that construct the pressure adjustment control valve; and determine, depending on the operation abnormality occurring in one of the pressure increasing linear control valve and the electromagnetic on-off valve, whether or not brake control is continuously carried out in a linear control mode in which the hydraulic pressure adjusted by the pressure adjustment control valve is transmitted from the power hydraulic pressure source to the wheel cylinder provided for each of front and rear right and left wheels of a vehicle, thereby generating braking forces on the front and rear right and left wheels.

Note that, in this case, the control means may include: operation abnormality determination means for using, when a magnitude of the hydraulic pressure detected by the first hydraulic pressure detection means is a predetermined magnitude, a magnitude of the hydraulic pressure detected by the third hydraulic pressure detection means to determine whether or not an operation abnormality occurs in one of the pressure increasing linear control valve and the electromagnetic on-off valve that construct the pressure adjustment control valve; and brake control determination means for determining, depending on the operation abnormality occurring in one of the pressure increasing linear control valve and the electromagnetic on-off valve, whether or not the brake control is continuously carried out in the linear control mode in which the hydraulic pressure adjusted by the pressure adjustment control valve is transmitted from the power hydraulic pressure source to the wheel cylinder provided for each of the front and rear right and left wheels of the vehicle, thereby generating the braking forces on the front and rear right and left wheels.

As a result, depending on the operation abnormality occurring in the pressure increasing linear control valve or the electromagnetic on-off valve, specifically, depending on cases such as a case where influence of the operation abnormality is small, and a case where, even when a function of the valve is restricted by the occurrence of the operation abnormality, the other valve can be used for dealing with the state, it can be determined whether or not the brake control is continuously carried out in the linear control mode. As a result, the hydraulic pressure from the power hydraulic pressure source can appropriately be transmitted to the wheel cylinders, thereby generating appropriate braking forces on the wheels.

Then, in this case, the control means may be configured to determine, in a case where the control means controls the pressure increasing linear control valve and the electromagnetic on-off valve to the closed state when the magnitude of the hydraulic pressure output from the power hydraulic pressure source and detected by the first hydraulic pressure detection means is the predetermined magnitude, and the magnitude of the hydraulic pressure detected by the third hydraulic pressure detection means increases, that a valve closing operation abnormality occurs in which the open state is maintained even when the change control of bringing one of the pressure increasing linear control valve and the electromagnetic on-off valve from the open state into the closed state is carried out. Further, the control means may be further configured to, when the control means determines that the valve closing operation abnormality occurs in one of the pressure increasing linear control valve and the electromagnetic on-off valve, based on the magnitude of the hydraulic pressure detected by the third hydraulic pressure detection means: carry out, when a leak of the working fluid from one of the pressure increasing linear control valve and the electromagnetic on-off valve is small, the brake control in the linear control mode, thereby generating the braking forces on the front and rear right and left wheels of the vehicle; and carry out, when the leak of the working fluid from one of the pressure increasing linear control valve and the electromagnetic on-off valve is large, the brake control in a backup mode on the front right and left wheel side to transmit the hydraulic pressure generated in the master cylinder to the wheel cylinder provided for each of the front right and left wheels of the vehicle, thereby generating the braking forces on the front right and left wheels.

In this case, more specifically, the control means may be configured to drive, when the control means determines that the valve closing operation abnormality occurs in one of the pressure increasing linear control valve and the electromagnetic on-off valve, the pressurizing pump to communicate a high pressure working fluid from the power hydraulic pressure source to the pressure increasing linear control valve and the electromagnetic on-off valve controlled to the open state, thereby carrying out flushing. Further, the control means may be further configured to: control again, when the magnitude of the hydraulic pressure detected by the first hydraulic pressure detection means is the predetermined magnitude, the pressure increasing linear control valve and the electromagnetic on-off valve to the closed state; carry out, when the magnitude of the hydraulic pressure detected by the third hydraulic pressure detection means is equal to or less than a predetermined value set in advance, the brake control in the linear control mode, thereby generating the braking forces on the front and rear right and left wheels of the vehicle; and carry out, when the magnitude of the hydraulic pressure detected by the third hydraulic pressure detection means is more than the predetermined value set in advance, the brake control in the backup mode on the front right and left wheel side, thereby generating the braking forces on the front right and left wheels of the vehicle.

As a result, in a case where the valve closing operation abnormality occurs in the pressure increasing linear control valve or the electromagnetic on-off valve, when a leak of the working fluid is small and influence of the occurring valve closing operation abnormality is small, the brake control can be carried out in the linear control mode, thereby generating braking forces on the front and rear right and left wheels, and when the leak of the working fluid is large, the hydraulic pressure supplied from the master cylinder can be used to generate braking forces on the front right and left wheels. More specifically, when the valve closing operation abnormality occurs in the pressure increasing linear control valve or the electromagnetic on-off valve, the flushing of communicating a high-pressure working fluid can be carried out in order to solve the valve closing operation abnormality. In dependence on an effect of the flushing, when the leak of working fluid is small, the brake control can be carried out in the linear control mode, thereby generating the braking forces on the front and rear right and left wheels, and when the leak of the working fluid is large, the braking forces can be generated on the front right and left wheels by the hydraulic pressure supplied from the master cylinder. As a result, the appropriate braking forces can be generated on the respective wheels depending on the occurring valve closing operation abnormality.

Moreover, the control means may be configured to determine, in a case where the control means controls the pressure increasing linear control valve and the electromagnetic on-off valve to the open state when the magnitude of the hydraulic pressure detected by the first hydraulic pressure detection means is the predetermined magnitude, and the magnitude of the hydraulic pressure detected by the third hydraulic pressure detection means is less than a magnitude of a target hydraulic pressure, that a valve opening operation abnormality occurs in which the closed state is maintained even when the change control of bringing one of the pressure increasing linear control valve and the electromagnetic on-off valve from the closed state into the open state is carried out. Further, the control means may be further configured to: carry out, when a temporal change gradient of the hydraulic pressure transmitted to the wheel cylinder corresponding to the operation by the driver on the brake pedal is less than a predetermined gradient set in advance, the brake control in the linear control mode to generate the braking forces on the front and real right and left wheels of the vehicle; and carry out, when the temporal change gradient is more than the predetermined gradient, the brake control in the backup mode on the front right and left wheel side and the rear right and left wheel side to transmit the hydraulic pressure generated in the master cylinder to the wheel cylinder provided for each of the front right and left wheels of the vehicle to generate the braking forces on the front right and left wheels, and to transmit the hydraulic pressure adjusted by the pressure adjustment control valve from the power hydraulic pressure source to the wheel cylinder provided for each of the rear right and left wheels of the vehicle to generate the braking forces on the rear right and left wheels.

In this case, more specifically, the control means may be configured to control, when the control means determines that the valve opening operation abnormality occurs in one of the pressure increasing linear control valve and the electromagnetic on-off valve, the pressure increasing linear control valve from the open state to the closed state, control the electromagnetic on-off valve to the open state, and identify, when the magnitude of the hydraulic pressure detected by the third hydraulic pressure detection means changes from the increase tendency in response to the control of bringing the pressure increasing linear control valve into the closed state, that the valve opening operation abnormality occurs in the electromagnetic on-off valve. Further, the control means may be further configured to: carry out, when the valve opening operation abnormality occurs in the electromagnetic on-off valve, the brake control in the linear control mode and in the backup mode on the front right and left wheel side and the rear right and left wheel side by the pressure increasing linear control by using only the pressure increasing control valve, thereby generating the braking forces on the front and rear right and left wheels of the vehicle.

Moreover, in this case, more specifically, the control means may be configured to control, when the control means determines that the valve opening operation abnormality occurs in one of the pressure increasing linear control valve and the electromagnetic on-off valve, the electromagnetic on-off valve from the open state to the closed state, control the pressure increasing linear control valve to the open state, and identify, when the magnitude of the hydraulic pressure detected by the third hydraulic pressure detection means changes from the increase tendency in response to the control of bringing the electromagnetic on-off valve into the closed state, that the valve opening operation abnormality occurs in the pressure increasing linear control valve. Further, the control means may be further configured to: carry out, when the valve opening operation abnormality occurs in the pressure increasing linear control valve, the brake control in the linear control mode and in the backup mode on the front right and left wheel side and the rear right and left wheel side by the pressure increasing control by using only the electromagnetic on-off valve, and the pressure decreasing control by using the pressure decreasing linear control valve, thereby generating the braking forces on the front and rear right and left wheels of the vehicle.

As a result, in a case where the valve opening operation abnormality occurs in the pressure increasing linear control valve or the electromagnetic on-off valve, when a temporal change gradient of the hydraulic pressure in the wheel cylinder corresponding to the operation by the driver on the brake pedal, in other words, requested by the operation on the brake pedal is small, the brake control can be carried out in the linear control mode, thereby generating the braking forces on the front and rear right and left wheels, and when the temporal change gradient of the hydraulic pressure is large, the braking forces can be generated by the hydraulic pressure supplied from the master cylinder on the front right and left wheels, and the braking forces can be generated by the hydraulic pressure supplied from the power hydraulic pressure source on the rear right and left wheels. In this case, more specifically, when the valve opening operation abnormality is identified to occur in the electromagnetic on-off valve, the pressure increasing control can be carried out by the pressure increasing linear control valve, which is the other one of the valves used for the pressure increasing control, to adjust the hydraulic pressure supplied from the power hydraulic pressure source, thereby transmitting the hydraulic pressure to the wheel cylinders. Moreover, when the valve opening operation abnormality is identified to occur in the pressure increasing linear control valve, the pressure increasing control is carried out by the electromagnetic on-off valve, which is the other one of the valves used for the pressure increasing control, and the pressure decreasing control is carried out by the pressure decreasing linear control valve, thereby adjusting the hydraulic pressure supplied from the power hydraulic pressure source, and transmitting the hydraulic pressure to the wheel cylinders. As a result, the normally operating valve out of the valves can be used to generate appropriate braking forces on the respective wheels depending on the occurring valve opening operation abnormality.

DESCRIPTION OF EMBODIMENT

Figure 1:
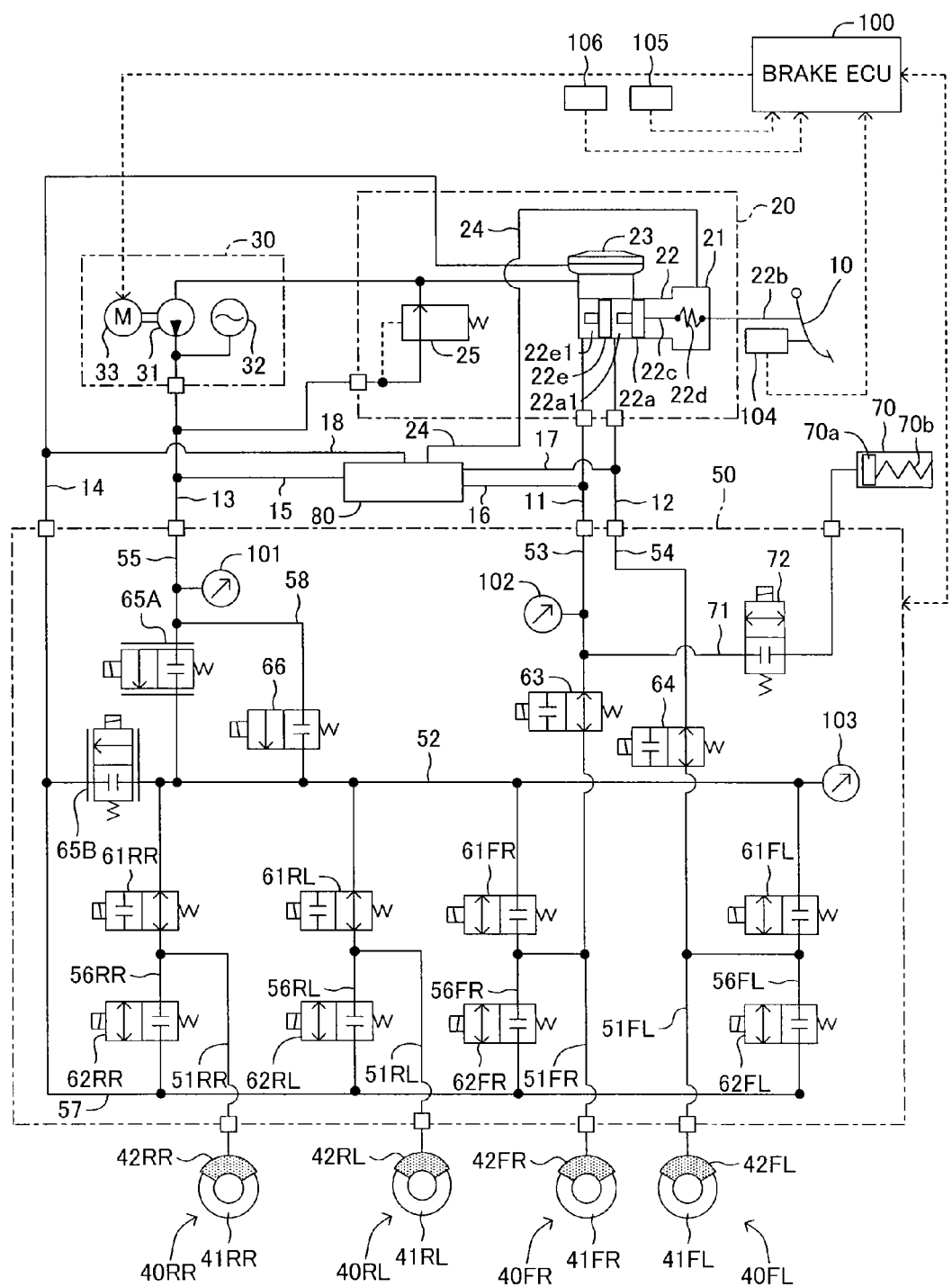
FIG. 1 is a schematic system diagram of a vehicle brake device according to an embodiment of the present invention.

Now, a vehicle brake device according to an embodiment of the present invention is described referring to the drawings. FIG. 1 is a schematic system diagram of the vehicle brake device according to this embodiment.

The brake device according to this embodiment includes a brake pedal 10, a master cylinder unit 20, a power hydraulic pressure generation device 30, a hydraulic pressure control valve device 50, a pressure increasing mechanism 80, and a brake ECU 100 for brake control. Brake units 40FR, 40FL, 40RR, and 40RL installed on respective wheels include brake rotors 41FR, 41FL, 41RR, and 41RL, and wheel cylinders 42FR, 42FL, 42RR, and 42RL integrated into brake calipers. The brake units 40 are not limited to the case where disk brakes are installed on all the four wheels, and, for example, drum brakes may be installed on all the four wheels, or the disk brakes and the drum brakes may be arbitrarily combined in such a way that the disk brakes are installed on the front wheels and the drum brakes are installed on the rear wheels. In the following description, configurations provided for the respective wheels are denoted by suffixes FR for the front right wheel, FL for the front left wheel, RR for the rear right wheel, and RL for the rear left wheel, but if the specification of the wheel position is not particularly necessary, the suffix is omitted.

The wheel cylinders 42FR, 42FL, 42RR, and 42RL are connected to the hydraulic pressure control valve device 50, and receive transmitted hydraulic pressures of the working fluid (brake fluid) supplied from the hydraulic pressure control device 50. Then, brake pads are pressed against the brake rotors 41FR, 41FL, 41RR, and 41RL rotating along with the wheels by the hydraulic pressure supplied from the hydraulic pressure control valve device 50, thereby applying braking forces to the wheels.

The master cylinder unit 20 includes a hydraulic pressure booster 21, a master cylinder 22, a reservoir 23, and a servo pressure pipe 24. The hydraulic pressure booster 21 is coupled to the brake pedal 10, and amplifies a pedal stepping force F (hereinafter simply referred to as "stepping force F") applied by the driver to the brake pedal 10. In other words, the hydraulic pressure booster 21 amplifies the stepping force F by being supplied with the working fluid (more specifically, a servo pressure Ps) via the servo pressure pipe 24 from the pressure increasing mechanism 80 for increasing the pressure of the working fluid by a mechanical operation as described later.

The master cylinder 22 according to this embodiment includes a pressurizing piston 22a, a first piston rod 22b coupled to the brake pedal 10, and a second piston rod 22c coupled to the pressurizing piston 22a. Then, the master cylinder 22 includes a stroke adjustment spring 22d arranged between the first piston rod 22b and the second piston rod 22c to couple the rods 22b and 22c to each other, for serving as an elastic body for adjusting a stroke caused by the stepping operation on the brake pedal 10. Moreover, the master cylinder 22 according to this embodiment is a tandem type including a pressurizing piston 22e as well as the pressurizing piston 22a, and the pressurizing pistons 22a and 22e are configured to stroke in response to the stepping force F input by the stepping operation on the brake pedal 10 via the first piston rod 22b, the stroke adjustment spring 22d, and the second piston rod 22c, thereby each generating a master cylinder pressure Pmc having a predetermined boost ratio.

The reservoir 23 for storing the working fluid is provided at a top of the master cylinder 22. In the master cylinder 22, when the stepping operation on the brake pedal 10 is released, and the pressurizing pistons 22a and 22e are retracted, pressurizing chambers 22a1 and 22e1 formed by the pressurizing pistons 22a and 22e communicate to the reservoir 23.

The power hydraulic pressure generation device 30 is a power hydraulic pressure source, and includes a pressurizing pump 31 and an accumulator 32. The pressurizing pump 31 has an inlet opening connected to the reservoir 23 and an outlet opening connected to the accumulator 32, and drives a motor 33 to pressurize the working fluid. The accumulator 32 converts pressure energy of the working fluid pressurized by the pressurizing pump 31 into pressure energy of a filler gas such as nitrogen, thereby accumulating the pressure energy. Moreover, the accumulator 32 is connected to a relief valve 25 provided to the master cylinder unit 20. The relief valve 25 opens when the pressure of the working fluid increases to a predetermined pressure or more, thereby returning the working fluid to the reservoir 23.

In this way, the brake device includes, as the hydraulic pressure source for applying a hydraulic pressure of the working fluid to the wheel cylinders 42, the master cylinder 22 for applying the hydraulic pressure by using the stepping force F input by the driver via the brake pedal 10, and the power hydraulic pressure generation device 30 for applying the hydraulic pressure independently of the master cylinder 22. Then, in the brake device, the master cylinder 22 and the power hydraulic pressure generation device 30 are connected respectively via master pressure pipes 11 and 12 and an accumulator pressure pipe 13 to the hydraulic pressure control valve device 50. Moreover, the reservoir 23 is connected via a reservoir pipe 14 to the hydraulic pressure control valve device 50.

The hydraulic pressure control valve device 50 includes four individual flow passages 51FR, 51FL, 51RR, and 51RL connected to the respective wheel cylinders 42FR, 42FL, 42RR, and 42RL, a main flow passage 52 for communicating to the individual flow passages 51FR, 51FL, 51RR, and 51RL, master pressure flow passages 53 and 54 for connecting the individual flow passages 51FR and 51FL and the master pressure pipes 11 and 12, respectively, to each other, and an accumulator pressure flow passage 55 for connecting the main flow passage 52 and the accumulator pressure pipe 13 to each other. The master pressure flow passages 53 and 54 and the accumulator pressure flow passage 55 are connected in parallel to one another with respect to the main flow passage 52.

Holding valves 61FR, 61FL, 61RR, and 61RL are respectively provided on the individual flow passages 51FR, 51FL, 51RR, and 51RL. According to this embodiment, the holding valves 61FR and 61FL respectively provided on the brake unit 40FR for the front right wheel and on the brake unit 40FL for the front left wheel are electromagnetic normally-closed on-off valves which are each configured to maintain a closed state by a biasing force of a spring in a non-current supply state of a solenoid, and be brought into an open state only in a current supply state of the solenoid. The holding valves 61RR and 61RL respectively provided on the brake unit 40RR for the rear right wheel and on the brake unit 40RL for the rear left wheel are electromagnetic normally-open on-off valves which are each configured to maintain an open state by a biasing force of a spring in a non-current supply state of a solenoid, and be brought into a closed state only in a current supply state of the solenoid.

As a result, in the holding valves 61FR and 61FL respectively provided on the right and left brake units 40FR and 40FL on the front wheel side, and the holding valves 61RR and 61RL respectively provided on the right and left brake units 40RR and 40RL on the rear wheel side, the holding valves on the front wheel side are the normally-closed electromagnetic on-off valves, and the holding valves on the rear wheel side are the normally-open electromagnetic on-off valves. As a result, when the holding valves 61FR and 61FL, which are the normally-closed electromagnetic on-off valves, are in the open state by the current supply to the solenoids on the right and left brake units 40FR and 40FL on the front wheel side, the main flow passage 52 and the wheel cylinders 42FR and 42FL communicate to each other. Moreover, when the holding valves 61RR and 61RL, which are the normally-open electromagnetic on-off valves, are in the closed state by the current supply to the solenoids on the right and left brake units 40RR and 40RL on the rear wheel side, the communication of the main flow passage 52 and the wheel cylinders 42RR and 42RL is shut off.

Moreover, pressure decreasing individual flow passages 56FR, 56FL, 56RR, and 56RL are respectively connected to the individual flow passages 51FR, 51FL, 51RR, and 51RL. The respective pressure decreasing individual flow passages 56 are connected to a reservoir flow passage 57. The reservoir flow passage 57 is connected via the reservoir pipe 14 to the reservoir 23. Pressure decreasing valves 62FR, 62FL, 62RR, and 62RL are respectively provided at intermediate portions of the pressure decreasing individual flow passages 56FR, 56FL, 56RR, and 56RL. The respective pressure decreasing valves 62 are normally-open electromagnetic on-off valves which are each configured to maintain a closed state by a biasing force of a spring in a non-current supply state of a solenoid, and be brought into an open state only in a current supply state of the solenoid. In the open state, each pressure decreasing valve 62 causes the working fluid to flow from the wheel cylinder 42 via the pressure decreasing individual flow passage 56 to the reservoir flow passage 57, thereby decreasing a wheel cylinder pressure (corresponding to a control pressure Px described later).

Master cut valves 63 and 64 are respectively provided at intermediate portions of the master pressure flow passages 53 and 54. The respective master cut valves 63 and 64 are normally-open electromagnetic on-off valves which are each configured to maintain an open state by a biasing force of a spring in a non-current supply state of a solenoid, and be brought into a closed state only in a current supply state of the solenoid. By providing the master cut valves 63 and 64 as described above, when the master cut valves 63 and 64 are in the closed state, the communication of the working fluid is shut off between the master cylinder 22 and the individual flow passages 51FR and 51FL, and when the master cut valves 63 and 64 are in the open state, the communication of the working fluid is permitted between the master cylinder 22 and the individual flow passages 51FR and 51FL.

Moreover, according to this embodiment, a simulator flow passage 71 is provided to the master pressure flow passage 53 so as to branch on an upstream side (master cylinder 22 side) with respect to the master cut valve 63. In this case, it should be understood that the present invention can also be carried out so that the simulator flow passage 71 is provided to the master pressure flow passage 54 on an upstream side with respect to the master cut valve 64. A stroke simulator 70 is connected via a simulator cut valve 72 to the simulator flow passage 71. The simulator cut valve 72 is a normally-closed electromagnetic on-off valve which is configured to maintain a closed state by a biasing force of a spring in a non-current supply state of a solenoid, and be brought into an open state only in a current supply state of the solenoid. As a result, when the simulator cut valve 72 is in the closed state, the communication of the working fluid is shut off between the master pressure flow passage 53 (or the master pressure flow passage 54) and the stroke simulator 70, and when the simulator cut valve 72 is in the open state, the communication of the working fluid is permitted between the master pressure flow passage 53 (or the master pressure flow passage 54) and the stroke simulator 70.

The stroke simulator 70 includes a piston 70a and a spring 70b, and introduces the working fluid in an amount corresponding to a brake operation amount (corresponding to a stroke Sm described later) on the brake pedal 10 by the driver into the inside thereof when the simulator cut valve 72 is in the open state. Then, the stroke simulator 70 displaces the piston 70a against the biasing force of the spring 70b in synchronous with the introduction of the working fluid (namely, the master cylinder pressure Pmc) into the inside, thereby enabling a stroke operation of the brake pedal 10 by the driver, and generating a reaction force corresponding to the brake operation amount to provide appropriate brake operation feeling to the driver.

A pressure increasing linear control valve 65A is provided at an intermediate portion of the accumulator pressure flow passage 55. Moreover, a pressure decreasing linear control valve 65B is provided between a connected point of the accumulator pressure flow passage 55 to the main flow passage 52 and the reservoir flow passage 57. The pressure increasing linear control valve 65A and the pressure decreasing linear control valve 65B are normally-closed electromagnetic linear control valves which are each configured to maintain a closed state by a biasing force of a spring in a non-current supply state of a solenoid, and increase a valve opening degree along with an increase in current supply amount (current value) to the solenoid. A detailed description is not given of the pressure increasing linear control valve 65A and the pressure decreasing linear control valve 65B, but each of the pressure increasing linear control valve 65A and the pressure decreasing linear control valve 65B maintains the closed state by a valve closing force represented by a difference between a spring force of biasing a valve body toward a valve closing direction by the built-in spring and a pressure difference force of biasing the valve body toward a valve opening direction by a pressure difference between a primary side (inlet side) through which the working fluid relatively high in pressure communicates and a secondary side (outlet side) through which the working fluid relatively low in pressure communicates.

On the other hand, each of the pressure increasing linear control valve 65A and the pressure decreasing linear control valve 65B opens at an opening degree corresponding to a balance between the forces acting on the valve body if an electromagnetic attraction force generated by the current supply to the solenoid and acting toward the direction to open the valve body exceeds the valve closing force, in other words, if a relationship of "electromagnetic attraction force>valve closing force (=spring force-pressure difference force)" holds true. Thus, by controlling the current supply amount (current value) to the solenoid, each of the pressure increasing linear control valve 65A and the pressure decreasing linear control valve 65B can adjust the opening degree corresponding to the pressure difference force, namely, the pressure difference between the primary side (inlet side) and the secondary side (outlet side). On this occasion, the pressure increasing linear control valve 65A and the pressure decreasing linear control valve 65B construct a pressure adjustment control valve according to the present invention. In the following description, if the pressure increasing linear control valve 65A and the pressure decreasing linear control valve 65B do not need to be distinguished from each other, they are also simply referred to as linear control valve 65.

Moreover, a branch flow passage 58 is provided to the accumulator pressure flow passage 55 at a location closer to the accumulator 32 than the pressure increasing linear control valve 65A in order to secure a volume (flow rate) of the working fluid supplied to the respective wheel cylinders 42. Further, an adjusted flow rate cut valve 66 arranged in parallel to the pressure increasing linear control valve 65A is provided on the branch flow passage 58. The adjusted flow rate cut valve 66 is an electromagnetic on-off valve which constructs the pressure adjustment control valve according to the present invention, and is a normally-closed electromagnetic on-off valve which is configured to maintain a closed state by a biasing force of a spring in a non-current supply state of a solenoid, and be brought into an open state only in a current supply state of the solenoid. As a result, when the adjusted flow rate cut valve 66 is in the closed state, the communication of the working fluid via the branch flow passage 58 is shut off, and the working fluid (namely, an adjusted accumulator pressure Pacc described later) is supplied only via the pressure increasing linear control valve 65A from the accumulator 32 to the main flow passage 52. Moreover, when the adjusted flow rate cut valve 66 is in the open state, the working fluid (namely, the accumulator pressure Pacc) is supplied via the branch flow passage 58 from the accumulator 32 to the main flow passage 52 in addition to the working fluid (namely, the adjusted accumulator pressure Pacc) supplied via the pressure increasing linear control valve 65A from the accumulator 32 to the main flow passage 52.

Moreover, the pressure increasing mechanism 80 for supplying the hydraulic pressure booster 21 of the master cylinder unit 20 with the servo pressure Ps is provided in the brake device in order to reduce a load during the stepping operation by the driver on the brake pedal 10. A description is now given of the pressure increasing mechanism 80 according to this embodiment. Note that, as the pressure increasing mechanism 80, any structure capable of always supplying the hydraulic pressure booster 21 with the servo pressure Ps by a mechanical operation as described later can be employed.

Figure 2:
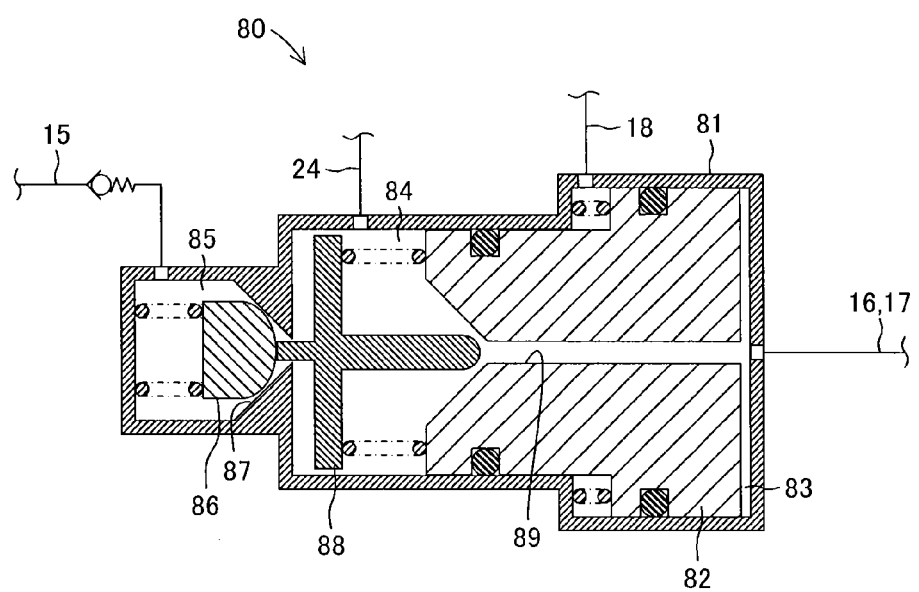
FIG. 2 is a schematic cross-sectional view illustrating a configuration of a pressure increasing mechanism of FIG. 1.

As illustrated in FIG. 2, the pressure increasing mechanism 80 includes a housing 81, and a stepped piston 82 fitted into the housing 81 in a liquid-tight and slidable manner. A large diameter chamber 83 is provided on a large diameter side of the stepped piston 82, and a small diameter chamber 84 is provided on a small diameter side thereof. The small diameter chamber 84 can communicate to a high pressure chamber 85 connected to the accumulator 32 of the power hydraulic pressure generation device 30 via a high pressure supply valve 86 and a valve seat 87. As illustrated in FIG. 2, the high pressure supply valve 86 is pressed against the valve seat 87 by a biasing force of a spring in the high pressure chamber 85, and is a normally-closed valve.

Moreover, a valve opening member 88 is provided in the small diameter chamber 84 so as to oppose the high pressure supply valve 86, and a spring is provided between the valve opening member 88 and the stepped piston 82. A biasing force of the spring acts toward a direction of separating the valve opening member 88 from the stepped piston 82. Moreover, as illustrated in FIG. 2, a return spring is provided between a step portion of the stepped piston 82 and the housing 81, thereby biasing the stepped piston 82 toward a backward moving direction. Note that, a stopper (not shown) is provided between the stepped piston 82 and the housing 81, thereby regulating a forward movement end position of the stepped piston 82.

Further, a communication passage 89 for communicating the large diameter chamber 83 and the small diameter chamber 84 to each other is formed in the stepped piston 82. The communication passage 89 causes the large diameter chamber 83 and the small diameter chamber 84 to communicate to each other in a state where the stepped piston 82 is separated from the valve opening member 88 at least a backward movement end position of the stepped piston 82, and, when the stepped piston 82 moves forward to abut against the valve opening member 88, the communication passage 89 is shut off. The pressure increasing mechanism 80 configured in this way operates as a mechanical pressure increasing device (mechanical servo).

Note that, as illustrated in FIGS. 1 and 2, the high pressure chamber 85 and the power hydraulic pressure generation device 30 are connected to each other via a high pressure supply passage 15, and a check valve for permitting communication of the working fluid from the power hydraulic pressure generation device 30 (more specifically, from the accumulator 32) to the high pressure chamber 85 and preventing communication in an opposite direction is provided on the high pressure supply flow passage 15. The check valve provided in this way permits the communication of the working fluid from the power hydraulic pressure generation device 30 to the high pressure chamber 85 when the hydraulic pressure (namely, the accumulator pressure Pacc) of the power hydraulic pressure generation device 30 (more specifically, the accumulator 32) is higher than the hydraulic pressure of the high pressure chamber 85. The check valve is in the closed state when the hydraulic pressure (namely, the accumulator pressure Pacc) of the power hydraulic pressure generation device 30 is equal to or lower than the hydraulic pressure of the high pressure chamber 85, and prevents the flows in the both directions. Thus, even if a liquid leak occurs in the power hydraulic pressure generation device 30, the working fluid is prevented from flowing backward from the high pressure chamber 85 to the power hydraulic pressure generation device 30, and the hydraulic pressure in the small diameter chamber 84 is prevented from decreasing. Further, in this embodiment, a first master pressure supply passage 16 for supplying the working fluid from the master pressure pipe 11 and a second master pressure supply passage 17 for supplying the working fluid from the master pressure pipe 12 are provided between the master pressure pipes 11 and 12 and an input side (namely, the large diameter chamber 83) of the pressure increasing mechanism 80, and the master cylinder pressure Pmc is supplied. Note that, a space formed between a step portion of the stepped piston 82 and the housing 81 is connected via a reservoir passage 18 to the reservoir 23.

A brief specific description is given of an operation of the pressure increasing mechanism 80. When the working fluid (master cylinder pressure Pmc) is supplied from the master cylinder 22 via the master pressure pipes 11 and 12 and the first master pressure supply passage 16 and the second master pressure supply passage 17 to the large diameter chamber 83 in the pressure increasing mechanism 80, the working fluid is supplied via the communication passage 89 to the small diameter chamber 84. Then, when a force in a forward movement direction (caused by the master cylinder pressure Pmc acting on the large diameter chamber 83) acting on the stepped piston 82 in response to the supply of the working fluid (master cylinder pressure Pmc) exceeds the biasing force of the return spring, the stepped piston 82 moves forward. Then, when the stepped piston 82 abuts against the valve opening member 88, and the communication passage 89 is shut off, the hydraulic pressure in the small diameter chamber 84 increases, and the working fluid increased in pressure (namely, the servo pressure Ps) is output via the servo pressure pipe 24 to the hydraulic pressure booster 21.

Moreover, when the high pressure supply valve 86 is switched to the open state by the forward movement of the valve opening member 88, the high pressure working fluid is supplied from the high pressure chamber 85 to the small diameter chamber 84, resulting in an increase in hydraulic pressure of the small diameter chamber 84. On the other hand, if the hydraulic pressure of the working fluid accumulated in the accumulator 32 of the power hydraulic pressure generation device 30 is higher than the hydraulic pressure in the high pressure chamber 85, the hydraulic pressure in the accumulator 32 is supplied via the check valve on the high pressure supply passage 15 to the high pressure chamber 85, and is then supplied to the small diameter chamber 84. Then, in the stepped piston 82, the hydraulic pressure in the large diameter chamber 83 is adjusted to such a magnitude that the force acting on the large diameter side (master cylinder pressure Pmc×pressure receiving area) and the force acting on the small diameter side (servo pressure Ps×pressure receiving area) are balanced each other, and the adjusted hydraulic pressure in the large diameter chamber 83 is output. Thus, the pressure increasing mechanism 80 can be considered as a mechanical booster mechanism.

On the other hand, when the hydraulic pressure in the accumulator 32 is equal to or less than the hydraulic pressure in the high pressure chamber 85, the check valve provided on the high pressure supply passage 15 prevents the flow of the working fluid between the accumulator 32 and the high pressure chamber 85, and the stepped piston 82 cannot move forward any more. Moreover, the stepped piston 82 may abut against the stopper to be restrained from moving forward.

The power hydraulic pressure generation device 30 and the hydraulic pressure control valve device 50 are controlled to be driven by the brake ECU 100 serving as control means. The brake ECU 100 includes a microcomputer constructed by a CPU, a ROM, a RAM, and the like as a main component, and includes a pump drive circuit, an electromagnetic valve drive circuit, an interface for inputting various sensor signals, and a communication interface. All the respective electromagnetic on-off valves 61 to 64, 66, and 72, and the linear control valves 65 provided in the hydraulic pressure control valve device 50 are connected to the brake ECU 100, and the open/closed states and the opening degrees (for the linear control valves 65) are controlled by solenoid drive signals output from the brake ECU 100. Moreover, the motor 33 provided to the power hydraulic pressure generation device 30 is also connected to the brake ECU 100, and is controlled to be driven by a motor drive signal output from the brake ECU 100.

The hydraulic pressure control valve device 50 is provided with an accumulator pressure sensor 101 as first hydraulic pressure detection means, a master cylinder pressure sensor 102 as second hydraulic pressure detection means, and a control pressure sensor 103 as third hydraulic pressure detection means. The accumulator pressure sensor 101 detects the accumulator pressure Pacc which is a hydraulic pressure of the working fluid in the accumulator pressure flow passage 55 on the power hydraulic pressure generation device 30 side (upstream side) with respect to the pressure increasing linear control valve 65A. The accumulator pressure sensor 101 outputs a signal representing the detected accumulator pressure Pacc to the brake ECU 100. The brake ECU 100 reads the accumulator pressure Pacc at a predetermined cycle, and, if the accumulator pressure Pacc is less than the predetermined lowest set pressure, the brake ECU 100 drives the motor 33 to pressurize the working fluid by the pressurizing pump 31, thereby controlling the accumulator pressure Pacc to be always maintained within a set pressure range.

The master cylinder pressure sensor 102 detects the master cylinder pressure Pmc which is a hydraulic pressure of the working fluid in the master pressure flow passage 53 on the master cylinder 22 side (upstream side) with respect to the master cut valve 63. In this case, it should be understood that the present invention can also be carried out so that the master cylinder pressure sensor 102 is provided to the master pressure flow passage 54 on an upstream side with respect to the location where the master cut valve 64 is provided. The master cylinder pressure sensor 102 outputs a signal representing the detected master cylinder pressure Pmc to the brake ECU 100. The control pressure sensor 103 outputs to the brake ECU 100 a signal representing a hydraulic pressure output via the pressure increasing linear control valve 65A and the adjusted flow rate cut valve 66 that construct the pressure adjustment control valve, specifically a control pressure Px (corresponding to the wheel cylinder pressure in the wheel cylinder 42 in a state of communicating to the main flow passage 52) which is a hydraulic pressure of the working fluid in the main flow passage 52.

Moreover, a stroke sensor 104 provided on the brake pedal 10 is connected to the brake ECU 100. The stroke sensor 104 outputs to the brake ECU 100 a signal representing a pedal stroke which is a stepping amount (operation amount) of the brake pedal 10 by the driver, namely, a total stroke Sm of movable parts (such as a stroke of the pressurizing piston 22a, a deflection of the stroke adjustment spring 22d, and a stroke of the piston 70a in the stroke simulator 70) constructing the master cylinder 22 coupled to the brake pedal 10. Moreover, a wheel speed sensor 105 is connected to the brake ECU 100. The wheel speed sensor 105 detects a wheel speed Vx, which is a rotational speed of the front and rear right and left wheels, and outputs the signal representing the detected wheel speed Vx to the brake ECU 100. Further, an indicator 106 for notifying the driver of an abnormality occurring in the brake device is connected to the brake ECU 100. The indicator 106 follows the control by the brake ECU 100, and notifies the driver of the abnormality occurring in the brake device as described later. Note that, as another sensor, a stepping force sensor for detecting the stepping force F input by the driver via the brake pedal 10 can be included.

A description is now given of brake control carried out by the brake ECU 100. In the normal state in which the brake device can normally operate, the brake ECU 100 carries out the brake control in a linear control mode (4S mode) of adjusting the hydraulic pressure (more specifically, the accumulator pressure Pacc) output from the power hydraulic pressure generation device 30 by using the linear control valves 65 (and the adjusted flow rate cut valve 66), and transmitting the adjusted hydraulic pressure to the respective wheel cylinders 42. On the other hand, as described later, when an operation abnormality occurs in the pressure increasing linear control valve 65A and the adjusted flow rate cut valve 66, depending on the occurring operation abnormality, the brake ECU 100 continuously carries out the brake control in the linear control mode, carries out the brake control in a backup mode (front wheel 2S mode) of transmitting the master cylinder pressure Pmc generated in the master cylinder 22 by the stepping force F of the driver to the wheel cylinders 42FR and 42FL of the front right and left wheels independently of the rear right and left wheels, or carries out the brake control in a backup mode (front wheel 2S+rear wheel 2S mode) of adjusting the accumulator pressure Pacc output from the power hydraulic pressure generation device 30 by the linear control valves 65 and the adjusted flow rate cut valve 66, and transmitting the adjusted accumulator pressure Pacc to the rear right and left wheel cylinders 42RR and 44RL.

Figure 3:
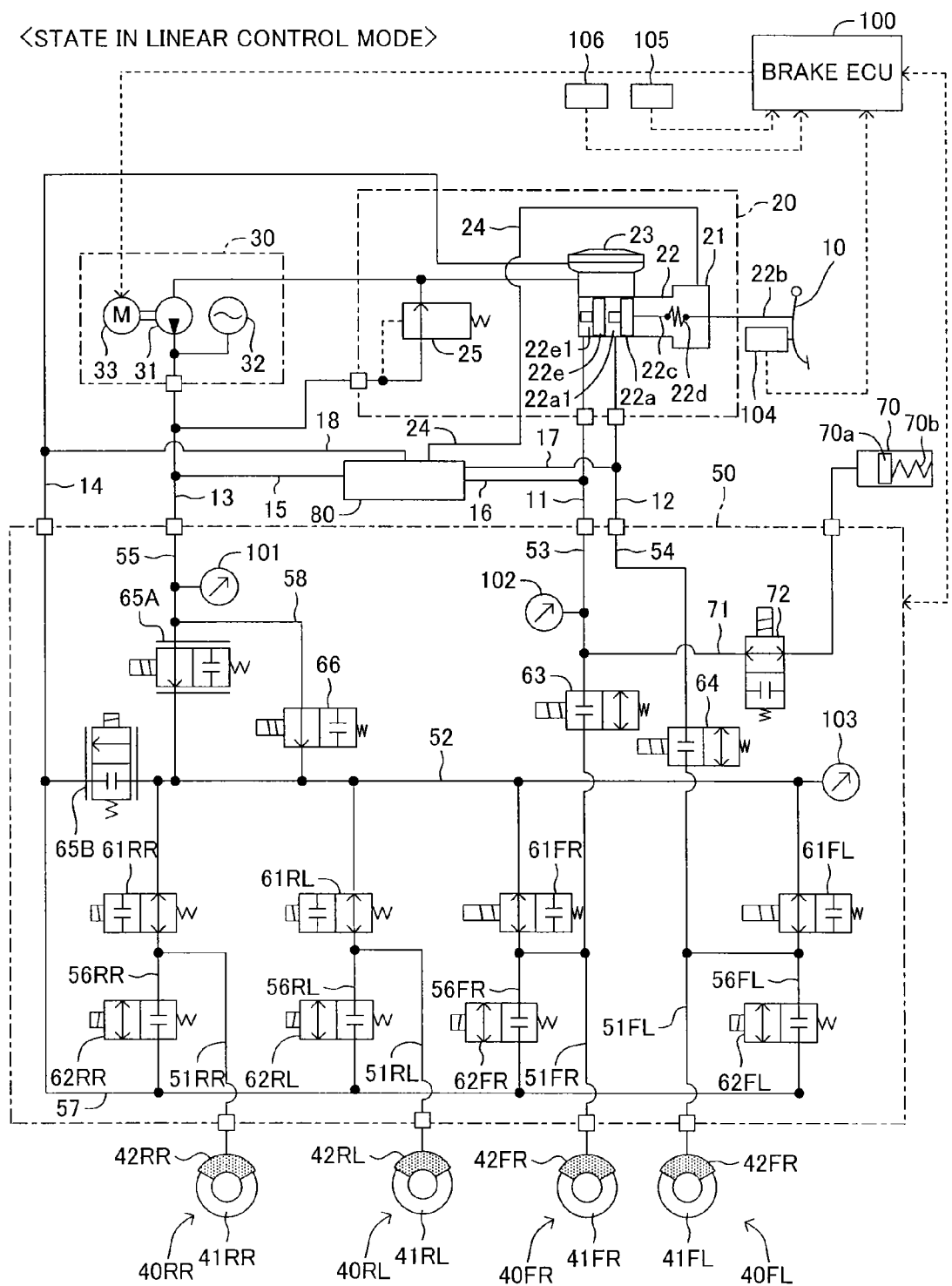
FIG. 3 is a diagram illustrating a linear control mode state by the vehicle brake device according to the embodiment of the present invention.

First, as illustrated in FIG. 3, in the linear control mode carried out when no abnormality occurs in the brake device, the brake ECU 100 maintains each of the normally-open master cut valves 63 and 64 in the closed state by the current supply to the solenoids, and maintains the simulator cut valve 72 in the open state by the current supply to the solenoid. Moreover, the brake ECU 100 controls the current supply amounts (current values) to the solenoids of the pressure increasing linear control valve 65A and the pressure decreasing linear control valve 65B so as to have the opening degrees corresponding to the current supply amounts, and, if necessary (specifically, when the operation amount by the driver on the brake pedal 10 is large or when the operation on the brake pedal 10 is sharp), maintains the adjusted flow rate cut valve 66 in the open state by the current supply to the solenoid.

Further, the brake ECU 100 maintains the normally-closed holding valves 61FR and 61FL in the open state by the current supply to the solenoids, maintains the normally-open holding valves 61RR and 61RL in the open state, and maintains the normally-closed pressure decreasing valves 62FR, 62FL, 62RR, and 62RL in the closed state. Although a detailed description is not given, for example, if the well-known anti-lock brake control based on the wheel speed Vx detected by the wheel speed sensor 105 is necessary to carry out, the brake ECU 100 controls the current supply to the respective solenoids of the holding valves 61 and the pressure decreasing valves 62 based on the anti-lock brake control, thereby bringing the holding valves 61 and the pressure decreasing valves 62 into the open state or the closed state.

The open state and the closed state of each of the valves constructing the hydraulic pressure control valve device 50 are controlled in this way. Thus, both the master cut valves 63 and 64 are maintained in the closed state in the linear control mode, and hence the hydraulic pressure (namely, the master cylinder pressure Pmc) output from the master cylinder unit 20 is not transmitted to the wheel cylinders 42. On the other hand, the pressure increasing linear control valve 65A and the pressure decreasing linear control valve 65B are in the current supply control state of the solenoids, and hence the hydraulic pressure (namely, the accumulator pressure Pacc) output from the power hydraulic pressure generation device 30 is adjusted by the pressure increasing linear control valve 65A and the pressure decreasing linear control valve 65B, and is transmitted to the wheel cylinders 42 at the four wheels. In this case, the holding valves 61 are maintained in the open state, and the pressure decreasing valves 62 are maintained in the closed state, and hence the wheel cylinders 42 each communicate to the main flow passage 52, and all the wheel cylinder pressures have the same value at the four wheels. The wheel cylinder pressure can be detected by the control pressure sensor 103 as the control pressure Px.

By the way, the vehicle on which the brake device according to this embodiment is installed may be, for example, an electric vehicle (EV) including a running motor driven by a battery power supply, a hybrid vehicle (HV) including an internal combustion engine in addition to the running motor, and a plug-in hybrid vehicle (PHV) which is a hybrid vehicle (HV) further including a battery rechargeable by using an external power supply. Each of those vehicles can carry out regenerative braking in the following manner. Electric power is generated by converting rotational energy of the wheels into electric energy by the running motor, thereby generating electricity, and the battery is charged by using the generated electric power, thereby acquiring a braking force. If the regenerative braking is carried out, a braking force is generated by the brake device, which is acquired by subtracting a regenerative braking force amount from a total braking force required for braking the vehicle, thereby carrying out brake regeneration cooperative control by using both the regenerative braking and the hydraulic braking.

Specifically, the brake ECU 100 receives a braking request, and then starts the brake regeneration cooperative control. The braking request is generated when the braking force needs to be applied to the vehicle, for example, when the driver carries out the stepping operation (hereinafter also simply referred to as "brake operation") on the brake pedal 10, or when automatic braking is requested to be operated. On this occasion, when the driver carries out the stepping operation on the brake pedal 10, the master cylinder pressure Pmc is supplied to the pressure increasing mechanism 80 via the master pressure pipes 11 and 12, the first master pressure supply passage 16, and the second master pressure supply passage 17. As a result, the servo pressure Ps is supplied from the pressure increasing mechanism 80 to the hydraulic pressure booster 21 via the servo pressure pipe 24, and the stepping operation on the brake pedal 10 by the driver is assisted. Moreover, the automatic brake may be operated in traction control, vehicle stability control, headway distance control, and collision prevention control, and if start conditions for those pieces of control are satisfied, the braking request is generated.

When the brake ECU 100 receives the braking request, the brake ECU 100 acquires at least one of the master cylinder pressure Pmc detected by the master cylinder pressure sensor 102 or the stroke Sm detected by the stroke sensor 104 as the brake operation amount, and calculates a target braking force which increases along with an increase in the master cylinder pressure Pmc and/or the stroke Sm. Regarding the brake operation amount, the present invention can also be carried out so that the target braking force is calculated based on, for example, a stepping force F on the brake pedal 10 acquired by providing a stepping force sensor for detecting the stepping force F in place of the acquisition of the master cylinder pressure Pmc and/or the stroke Sm.

Then, the brake ECU 100 transmits information representing the calculated target braking force to a hybrid ECU (not shown) in the brake regeneration cooperative control. The hybrid ECU calculates the braking force generated by the power regeneration among the target braking forces, and transmits information representing the regenerative braking force, which is a calculation result, to the brake ECU 100. As a result, the brake ECU 100 can calculate the target hydraulic pressure braking force, which is the braking force to be generated on the brake device, by subtracting the regenerative braking force from the target braking force. The regenerative braking force generated by the power regeneration carried out by the hybrid ECU is changed not only by a change in the rotational speed of the motor but also by the regenerative power control depending on a charged state (SOC: state of charge) of the battery. Thus, an appropriate target hydraulic pressure braking force can be calculated by subtracting the regenerative braking force from the target braking force.

The brake ECU 100 calculates, based on the calculated target hydraulic pressure braking force, a target hydraulic pressure for each of the wheel cylinders 42 corresponding to the target hydraulic pressure braking force, and controls the drive currents for the pressure increasing linear control valve 65A and the pressure decreasing linear control valve 65B by feedback control so that the wheel cylinder pressure is equal to the target hydraulic pressure. In other words, the brake ECU 100 controls the current supply amounts (current values) for the solenoids of the pressure increasing linear control valve 65A and the pressure decreasing linear control valve 65B so that the control pressure Px (=wheel cylinder pressure) detected by the control pressure sensor 103 follows the target hydraulic pressure.

As a result, the working fluid is supplied from the power hydraulic pressure generation device 30 via the pressure increasing linear control valve 65A and, if necessary, via the adjusted flow rate cut valve 66 to the respective wheel cylinders 42, resulting in generation of the braking forces on the wheels. Moreover, the working fluid is discharged from the wheel cylinders 42 via the pressure decreasing linear control valve 65B to the reservoir flow passage 57, and the braking forces generated on the respective wheels are thus appropriately adjusted.

Then, when the braking operation by the driver is released, the current supply to the solenoids of all the electromagnetic valves constructing the hydraulic pressure control valve device 50 is shut off, and, finally, all the electromagnetic control valves are returned to original positions illustrated in FIG. 1. Moreover, the stepped piston 82 is returned to the backward movement end in the pressure increasing mechanism 80, and the large diameter chamber 83 and the small diameter chamber 84 communicate to each other via the communication passage 89. All the electromagnetic valves are finally returned to the original positions in this way. Consequently, the hydraulic pressure (working fluid) in the brake cylinder 42FR on the front right wheel is returned via the master cut valve 63 in the open state to the master cylinder 22 and the reservoir 23, and the hydraulic pressure (working fluid) in the brake cylinder 42FL on the front left wheel is returned via the master cut valve 64 in the open state to the master cylinder 22 and the reservoir 23. The hydraulic pressures (working fluid) of the brake cylinder 42RR on the rear right wheel and the brake cylinder 42RL on the rear left wheel are returned respectively via the pressure decreasing valves 62RR and 62RL temporarily brought into the open state and the reservoir flow passage 57 to the reservoir 23.

Note that, the present invention does not always need to carry out the brake regeneration cooperative control, and it should be understood that the present invention can be applied to a vehicle on which the regenerative braking force is not generated. In this case, the target hydraulic pressure only needs to be directly calculated based on the brake operation amount. The target hydraulic pressure is set by using, for example, a map, a calculation equation, or the like so as to have a large value as the brake operation amount increases.

By the way, when the brake control is carried out in the above-mentioned linear control mode (4S mode), in a case where a valve closing operation abnormality in which the pressure increasing linear control valve 65A or the adjusted flow rate cut valve 66 maintains the open state regardless of the change control from the open state to the closed state occurs, an unintended downstream flow of the working fluid occurs, and it becomes difficult to control the wheel cylinder pressure in each of the wheel cylinders 42, namely, the control pressure Px to appropriately follow the target hydraulic pressure. Conversely, when the brake control is carried out in the above-mentioned linear control mode (4S mode), in a case where a valve opening operation abnormality in which the pressure increasing linear control valve 65A or the adjusted flow rate cut valve 66 maintains the closed state regardless of the change control from the closed state to the open state occurs, the working fluid does not flow downstream as intended, and it becomes difficult to control the control pressure Px in each of the wheel cylinders 42 to appropriately follow the target hydraulic pressure.

Therefore, in the linear control mode, the brake ECU 100 determines whether or not the valve closing operation abnormality or the valve opening operation abnormality occurs in one of the pressure increasing linear control valve 65A and the adjusted flow rate cut valve 66, and identifies the valve in which the valve closing operation abnormality or the valve opening operation abnormality occurs. Then, the brake ECU 100 carries out the brake control depending on the occurring valve closing operation abnormality or valve opening operation abnormality. A detailed description is now given of the determination of the absence/presence of the valve closing operation abnormality or the valve opening operation abnormality, the identification of the valve in which the abnormality occurs, and the countermeasure against the occurring abnormality by the brake ECU 100. For the sake of easy understanding of the description, a detailed description is given of the determination of the absence/presence of the abnormality, the identification of the valve in which the abnormality occurs, and the countermeasure against the occurring abnormality in a sequence of A. a case where the valve closing operation abnormality occurs in the pressure increasing linear control valve 65A or the adjusted flow rate cut valve 66, and B. a case where the valve opening operation abnormality occurs in the pressure increasing linear control valve 65A or the adjusted flow rate cut valve 66.

A. Case where Valve Closing Operation Abnormality Occurs in Pressure Increasing Linear Control Valve 65A or Adjusted Flow Rate Cut Valve 66

A-1. Determination of the Absence/Presence of Valve Closing Operation Abnormality As described above, when the brake control is carried out in the linear control mode (4S mode), the brake ECU 100 controls the valve opening degree of the pressure increasing linear control valve 65A through the current supply control. Further, for example, when the brake operation amount by the driver on the brake pedal 10 is large, the brake ECU 100 maintains the adjusted flow rate cut valve 66 in the open state, thereby securing supplied flow rates (volumes) of the working fluid to the respective wheel cylinders 42 to control the control pressure Px to follow the target hydraulic pressure. On the other hand, if the brake operation by the driver is released, the brake ECU 100 shuts off the current supplies to the solenoids of the pressure increasing linear control valve 65A and the adjusted flow rate cut valve 66 so as to prevent the working fluid from flowing from the accumulator 32 to the main flow passage 52, thereby bringing the valves from the open state to the closed state, and maintaining the closed state.

In this case, when the valve closing operation abnormality does not occur in the pressure increasing linear control valve 65A or the adjusted flow rate cut valve 66, even if the pressurizing pump 31 of the power hydraulic pressure generation device 30 is driven to increase the accumulator pressure Pacc supplied from the accumulator 32, the control pressure Px detected by the control pressure sensor 103 communicating to the main flow passage 52 does not increase. In contrast, for example, if a foreign matter exists in a valve portion of the pressure increasing linear control valve 65A or the adjusted flow rate cut valve 66, the valve closing operation abnormality occurs, and if the pressurizing pump 31 of the power hydraulic pressure generation device 30 is driven to increase the accumulator pressure Pacc supplied from the accumulator 32, the control pressure Px detected by the control pressure sensor 103 communicating to the main flow passage 52 increases. The brake ECU 100 determines whether or not the valve closing operation abnormality occurs in the pressure increasing linear control valve 65A or the adjusted flow rate cut valve 66 based on those states.

Figure 4:
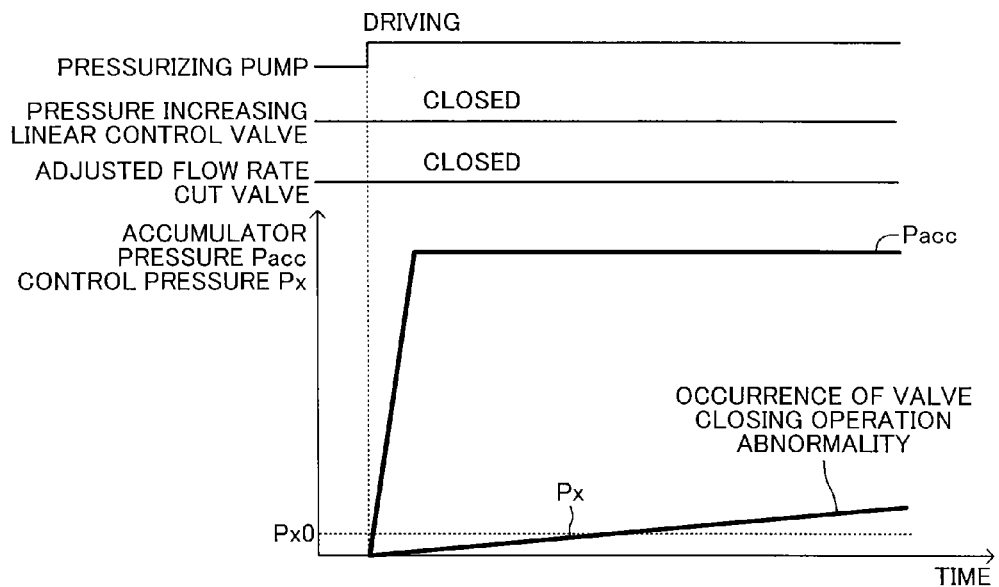
FIG. 4 is a graph showing determination of a valve closing operation abnormality occurring in a pressure increasing linear control valve or an adjusted flow rate cut valve.

Specifically, as shown in FIG. 4, the brake ECU 100 drives the pressurizing pump 31 of the power hydraulic pressure generation device 30 while the brake ECU 100 shuts off the current supply to the solenoids of the pressure increasing linear control valve 65A and the adjusted flow rate cut valve 66, thereby controlling those valves to the closed state. Then, the brake ECU 100 acquires the control pressure Px from the control pressure sensor 103, and determines whether or not the control pressure Px is larger than a predetermined value Px0 set in advance and used to determine absence/presence of the valve closing operation abnormality. In other words, in response to the increase in the accumulator pressure Pacc to the predetermined value after the pressurizing pump 31 is driven, if the magnitude of the acquired control pressure Px is more than the predetermined value Px0, the brake ECU 100 determines that the valve closing operation abnormality occurs in any one of the pressure increasing linear control valve 65A and the adjusted flow rate cut valve 66, resulting in an unintended flow of the working fluid from the accumulator 32 to the main flow passage 52. On the other hand, after the pressurizing pump 31 is driven, if the magnitude of the acquired control pressure Px is equal to or less than the predetermined value Px0, the brake ECU 100 determines that the valve closing operation abnormality does not occur in both of the pressure increasing linear control valve 65A and the adjusted flow rate cut valve 66.

A-2. Identification of Valve in which Valve Closing Operation Abnormality Occurs As described above, the brake ECU 100 drives the pressurizing pump 31, and can then compare the magnitude of the control pressure Px acquired from the control pressure sensor 103 and the predetermined value Px0, thereby determining whether or not the valve closing operation abnormality occurs in the pressure increasing linear control valve 65A or the adjusted flow rate cut valve 66. However, the brake ECU 100 still cannot identify in which one of the pressure increasing linear control valve 65A and the adjusted flow rate cut valve 66 the valve closing operation abnormality occurs only by this determination. Then, the brake ECU 100 identifies in which one of the pressure increasing linear control valve 65A and the adjusted flow rate cut valve 66 the valve closing operation abnormality occurs based on a change in the control pressure Px when the brake ECU 100 sequentially supplies currents to the solenoids of the respective pressure increasing linear control valve 65A and adjusted flow rate cut valve 66 to bring the valves from the closed state to the open state. A description is now given of the identification.

Figure 5:
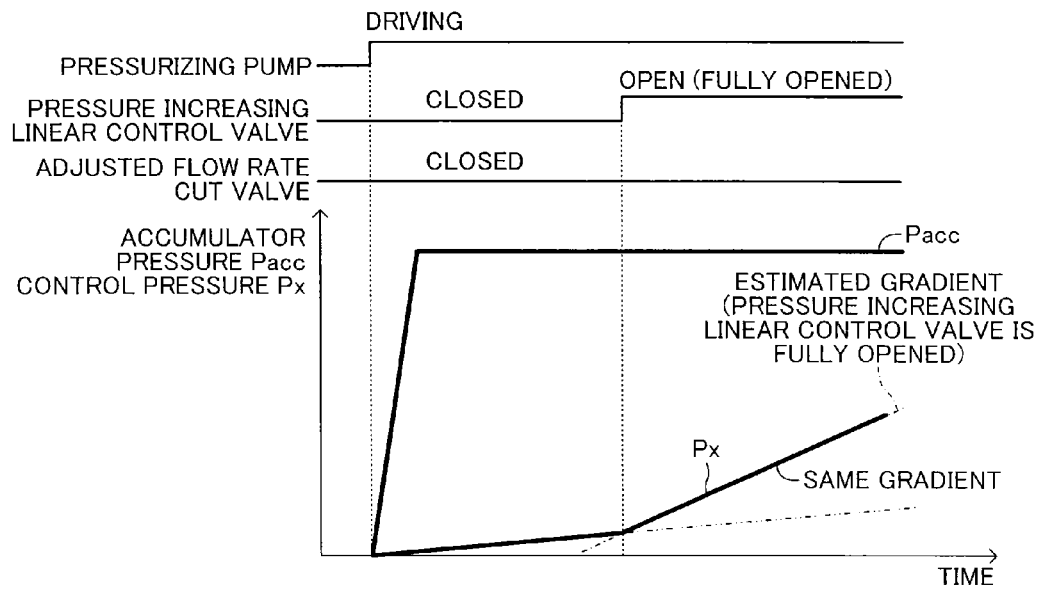
FIG. 5 is a graph showing identification of the valve closing operation abnormality occurring in the pressure increasing linear control valve by controlling the pressure increasing linear control valve to fully open.

As described above, if the brake ECU 100 determines that the valve closing operation abnormality occurs in the pressure increasing linear control valve 65A or the adjusted flow rate cut valve 66, as shown in FIG. 5, the brake ECU 100 supplies the solenoid with a current to fully open the pressure increasing linear control valve 65A. Note that, the brake ECU 100 does not supply the solenoid with a current in order to maintain the adjusted flow rate cut valve 66 in the closed state.

Figure 6:
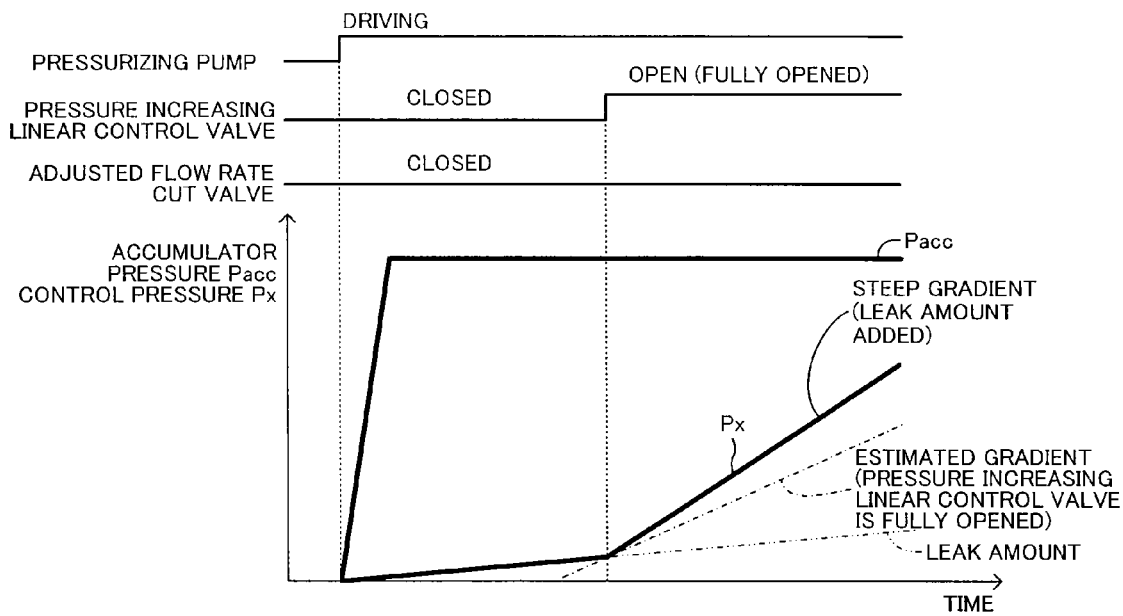
FIG. 6 is a graph showing identification of the valve closing operation abnormality occurring in the adjusted flow rate cut valve by controlling the pressure increasing linear control valve to fully open.

After the pressure increasing linear control valve 65A is fully opened in this way, if a magnitude of a temporal change gradient of the control pressure Px acquired from the control pressure sensor 103 is equal to a magnitude of an estimated gradient (indicated by the dashed-dotted line in FIG. 5) set in advance and acquired when the pressure increasing linear control valve 65A is fully opened, the brake ECU 100 determines that the valve closing operation abnormality occurs in the pressure increasing linear control valve 65A. On the other hand, as shown in FIG. 6, after the pressure increasing linear control valve 65A is fully opened, if the magnitude of the temporal change gradient of the control pressure Px acquired from the control pressure sensor 103 is larger (steeper in gradient) than a magnitude of an estimated gradient (indicated by the dashed-dotted line in FIG. 6), a leak amount indicated by the chain double-dashed line in FIG. 6, namely, a leak amount via the adjusted flow rate cut valve 66 is added, and the brake ECU 100 determines that the valve closing operation abnormality occurs in the adjusted flow rate cut valve 66.

Figure 7:
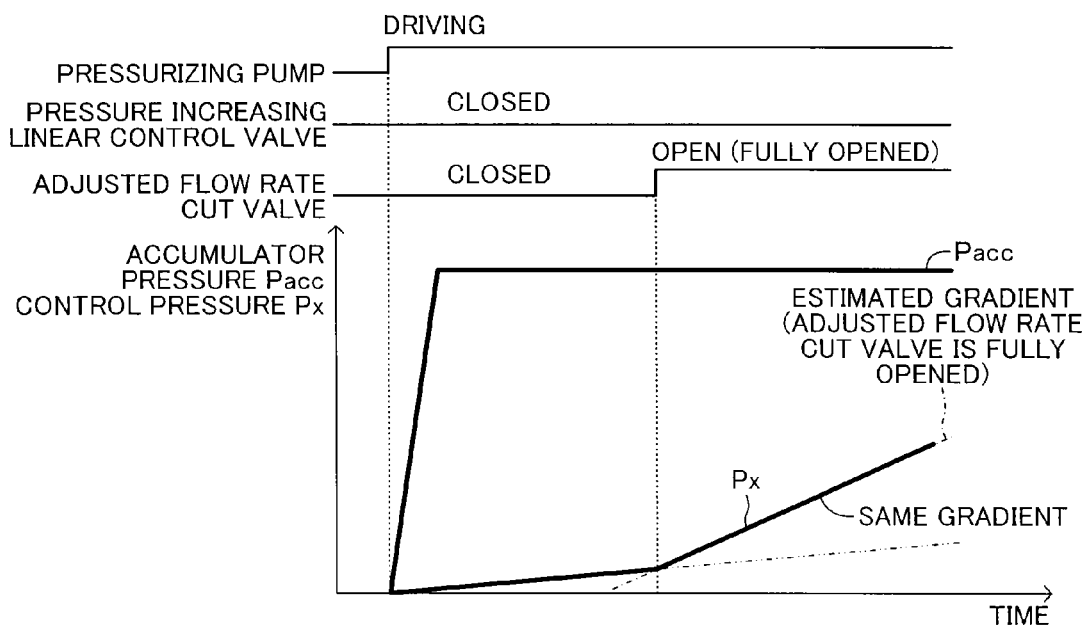
FIG. 7 is a graph showing identification of the valve closing operation abnormality occurring in the adjusted flow rate cut valve by controlling the adjusted flow rate cut valve to fully open.

Moreover, as described above, if the brake ECU 100 determines that the valve closing operation abnormality occurs in the pressure increasing linear control valve 65A or the adjusted flow rate cut valve 66, as shown in FIG. 7, the brake ECU 100 supplies the solenoid with a current to fully open the adjusted flow rate cut valve 66. Note that, the brake ECU 100 does not supply the solenoid with a current in order to maintain the pressure increasing linear control valve 65A in the closed state.

Figure 8:
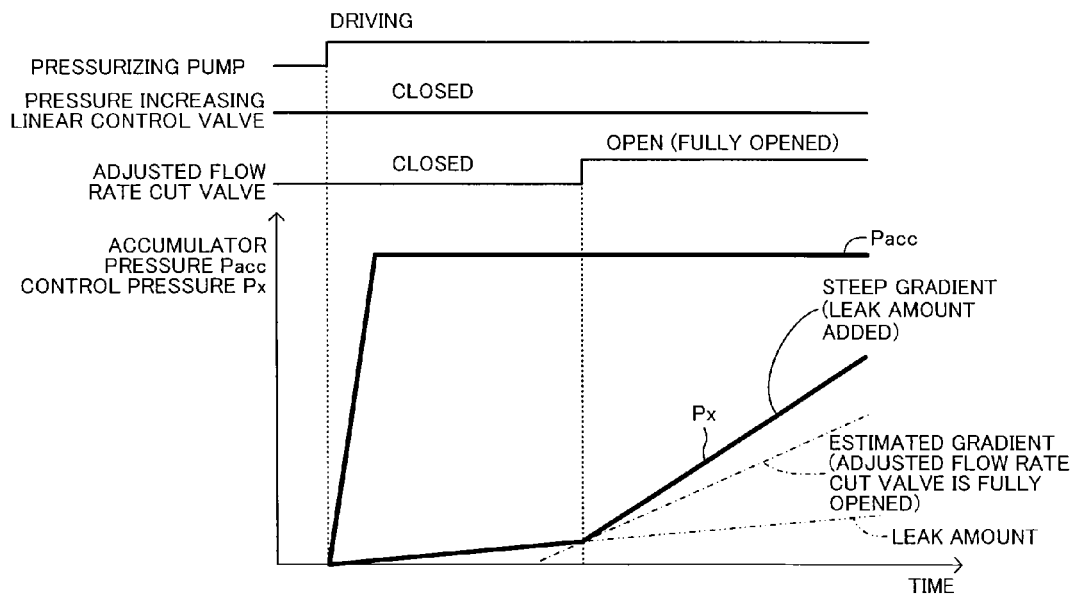
FIG. 8 is a graph showing identification of the valve closing operation abnormality occurring in the pressure increasing linear control valve by controlling the adjusted flow rate cut valve to fully open.

After the adjusted flow rate cut valve 66 is fully opened in this way, if the magnitude of the temporal change gradient of the control pressure Px acquired from the control pressure sensor 103 is equal to a magnitude of an estimated gradient (indicated by the dashed-dotted line in FIG. 7) set in advance and acquired when the adjusted flow rate cut valve 66 is fully opened, the brake ECU 100 determines that the valve closing operation abnormality occurs in the adjusted flow rate cut valve 66. On the other hand, as shown in FIG. 8, after the adjusted flow rate cut valve 66 is fully opened, if the magnitude of the temporal change gradient of the control pressure Px acquired from the control pressure sensor 103 is larger (steeper in gradient) than a magnitude of an estimated gradient (indicated by the dashed-dotted line in FIG. 8), a leak amount indicated by the chain double-dashed line in FIG. 8, namely, a leak amount via the pressure increasing linear control valve 65A is added, and the brake ECU 100 determines that the valve closing operation abnormality occurs in the pressure increasing linear control valve 65A.

A-3. Countermeasure Against Occurring Valve Closing Operation Abnormality

The valve closing operation abnormality occurs in the pressure increasing linear control valve 65A or the adjusted flow rate cut valve 66 with high possibility by catching a foreign matter contained in the working fluid, for example. Therefore, if the brake ECU 100 determines that the valve closing operation abnormality occurs as described above, the brake ECU 100 drives the pressurizing pump 31 of the power hydraulic pressure generation device 30 to supply the high-pressure working fluid, in other words, carries out so-called flushing to flow off the caught foreign matter while the pressure increasing linear control valve 65A and the adjusted flow rate cut valve 66 are fully opened.

Figure 9:
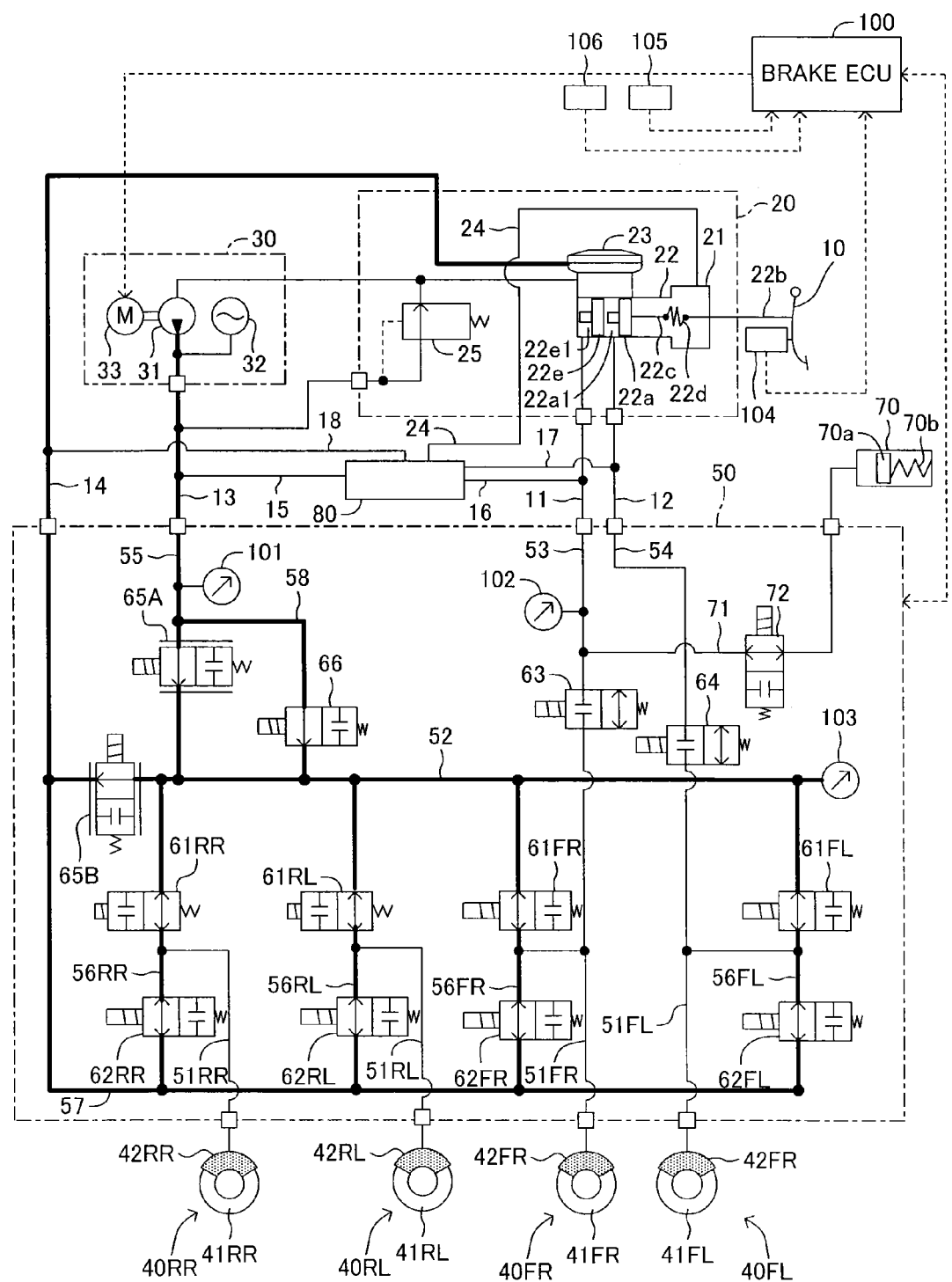
FIG. 9 is a diagram illustrating flows of a working fluid due to flushing carried out when the valve closing operation abnormality occurs in the pressure increasing linear control valve or the adjusted flow rate cut valve.

In other words, when the brake ECU 100 carries out the flushing, the brake ECU 100 supplies currents to the solenoids of the pressure increasing linear control valve 65A and the adjusted flow rate cut valve 66, thereby bringing the valves into the fully open state, and drives the pressurizing pump 31 of the power hydraulic pressure generation device 30 to increase the pressure of the accumulator pressure Pacc. On the other hand, as illustrated in FIG. 9, in order to surely remove and collect the foreign matter, the brake ECU 100 supplies the solenoid of the pressure decreasing linear control valve 65B with a current so as to bring the pressure decreasing linear control valve 65B into the fully open state, and supplies the solenoid of the pressure decreasing valves 62 with currents so as to bring the pressure decreasing valves 62 into the fully open state. As a result, the main flow passage 52 can communicate via the pressure decreasing linear control valve 65B and the pressure decreasing valve 62 to the reservoir flow passage 57, thereby returning the working fluid, which has passed through the pressure increasing linear control valve 65A and the adjusted flow rate cut valve 66, via the reservoir pipe 14 to the reservoir 23. Note that, a filter for removing foreign matters in the working fluid is provided on the reservoir 23.

Figure 10:
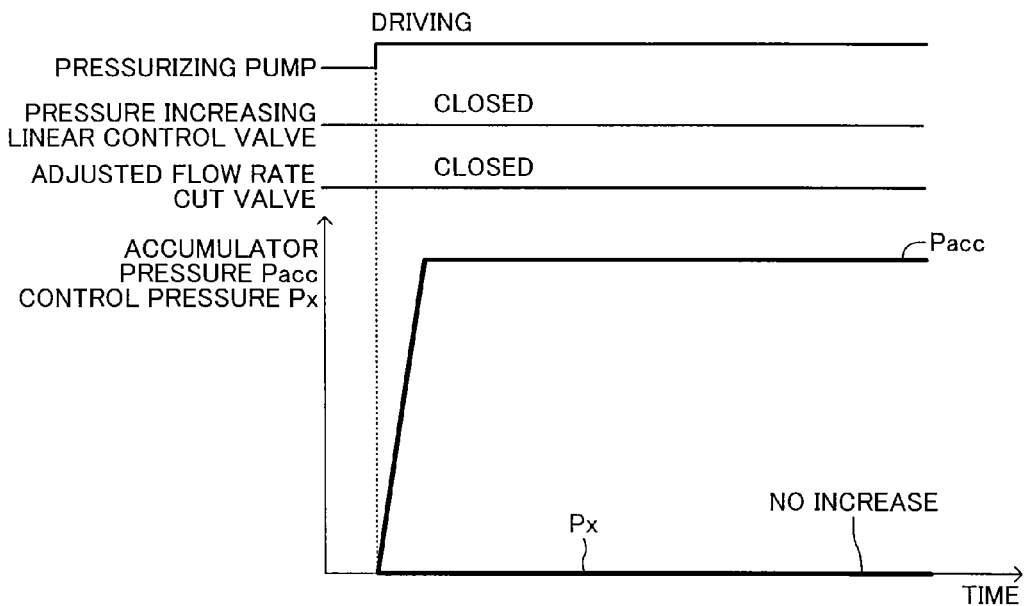
FIG. 10 is a graph showing such a state that the pressure increasing linear control valve and the adjusted flow rate cut valve are returned to normal states by carrying out the flushing.

Then, after the brake ECU 100 carries out the flushing as described above, the brake ECU 100 brings again the pressure increasing linear control valve 65A and the adjusted flow rate cut valve 66 into the closed state, and drives the pressurizing pump 31. As a result, as shown in FIG. 10, if the control pressure Px acquired from the control pressure sensor 103 does not increase in response to an increase in the accumulator pressure Pacc caused by the drive of the pressurizing pump 31, the brake ECU 100 determines that the pressure increasing linear control valve 65A or the adjusted flow rate cut valve 66 in which the valve closing operation abnormality occurred has recovered to the normal state. Thus, after the pressure increasing linear control valve 65A and the adjusted flow rate cut valve 66 have recovered to the normal state, the brake ECU 100 carries out the brake control in the above-mentioned linear control mode.

Figure 11:
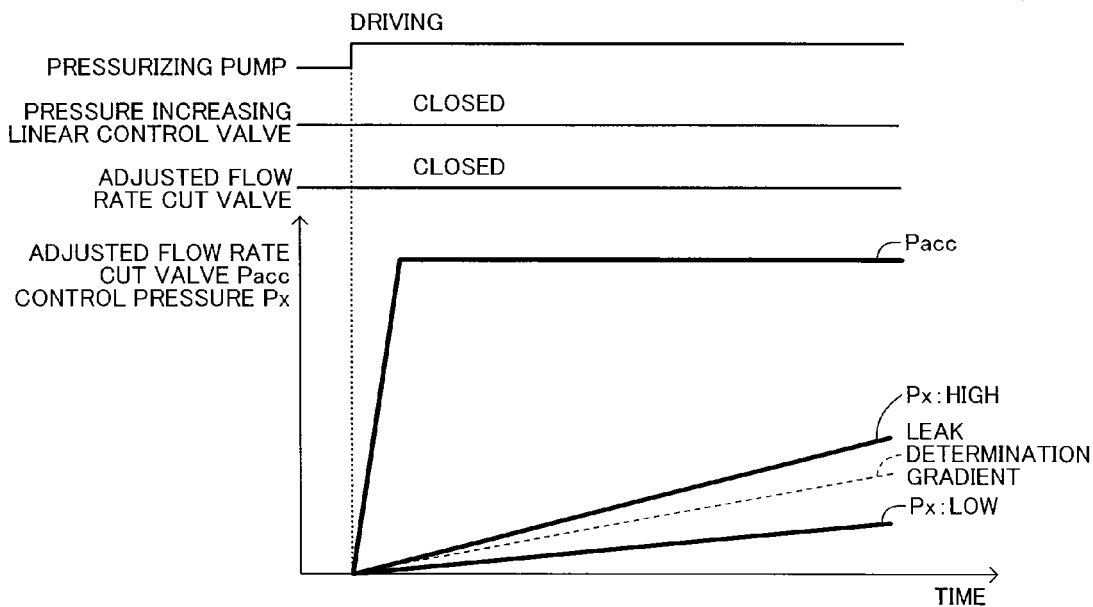
FIG. 11 is a graph showing such a state that the valve closing operation abnormality still occurs in the pressure increasing linear control valve or the adjusted flow rate cut valve even after the flushing is carried out.

On the other hand, as shown in FIG. 11, if the control pressure Px acquired from the control pressure sensor 103 increases as time elapses after the flushing is carried out as described above, the brake ECU 100 determines that the pressure increasing linear control valve 65A or the adjusted flow rate cut valve 66 in which the valve closing operation abnormality occurred has not yet recovered to the normal state. Then, the brake ECU 100 determines whether or not the magnitude of the temporal change gradient of the control pressure Px is larger than a magnitude of a leak determination gradient (indicated by the long broken line in FIG. 11) set in advance.

Figure 12:
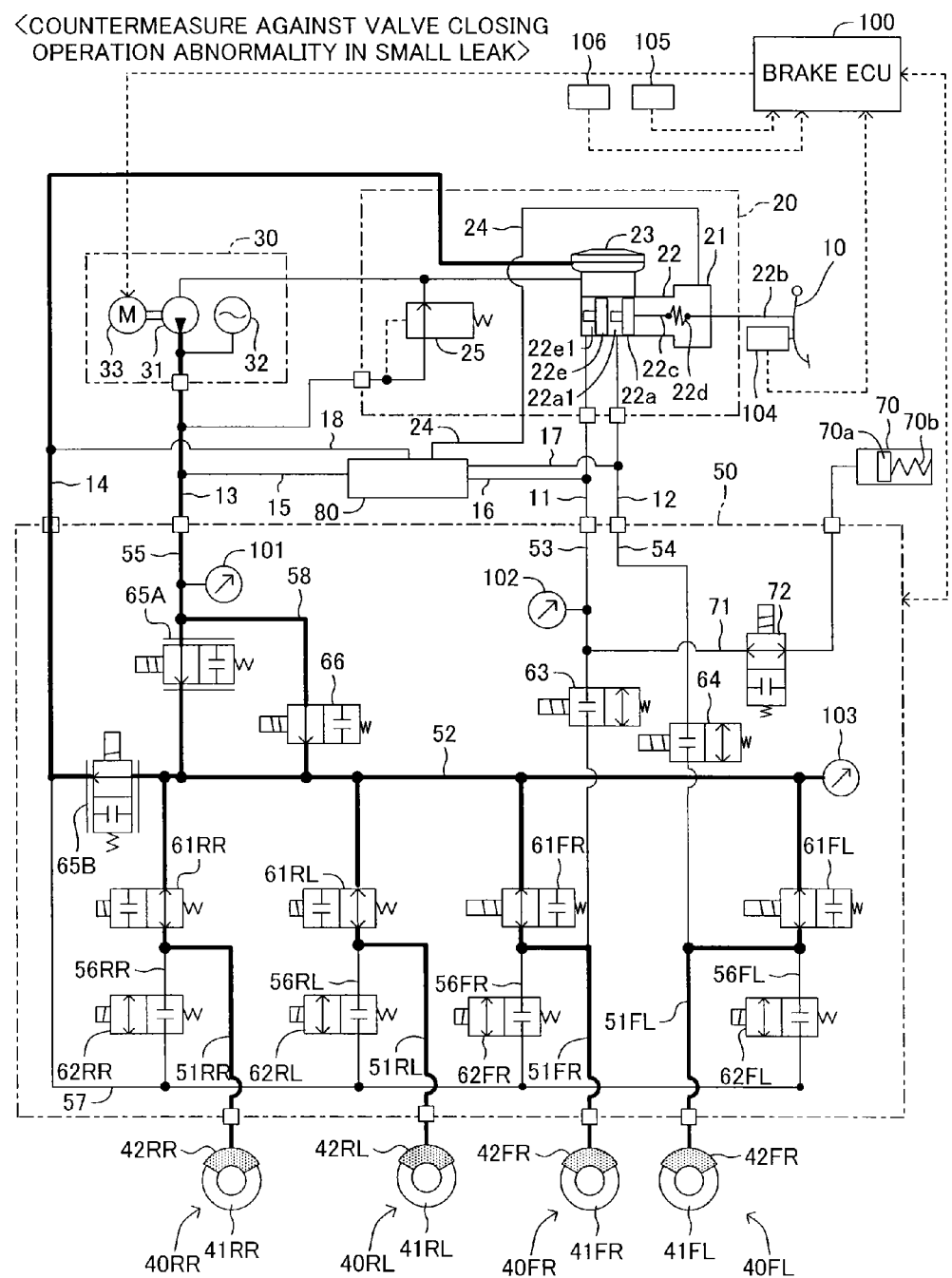
FIG. 12 is a diagram illustrating a countermeasure for a case where a leak of the working fluid caused by the valve closing operation abnormality occurring in the pressure increasing linear control valve or the adjusted flow rate cut valve is small.

Specifically, if the magnitude of the temporal change gradient of the control pressure Px is smaller than the magnitude of the leak determination gradient, the leak of the working fluid via the pressure increasing linear control valve 65A or the adjusted flow rate cut valve 66 in which the valve closing operation abnormality occurs is small, and hence the brake ECU 100 carries out the brake control in the linear control mode. In this case, as illustrated in FIG. 12, the brake ECU 100 opens/closes the pressure decreasing linear control valve 65B, thereby appropriately decreasing the control pressure Px which is relatively increased by the valve closing operation abnormality occurring in the pressure increasing linear control valve 65A or the adjusted flow rate cut valve 66, which is different from the linear control mode in the normal state described above (in other words, when the pressure increasing linear control valve 65A and the adjusted flow rate cut valve 66 are in the normal states).

Regarding the opening/closing control for the pressure decreasing linear control valve 65B, based on the magnitude of the control pressure Px acquired from the control pressure sensor 103, if the control pressure Px is larger (higher) than the target hydraulic pressure, the brake ECU 100 opens the pressure decreasing linear control valve 65B, thereby communicating the main flow passage 52 and the reservoir flow passage 57 to each other. On the other hand, based on the magnitude of the control pressure Px acquired from the control pressure sensor 103, if the control pressure Px is appropriate with respect to or smaller (lower) than the target hydraulic pressure, the brake ECU 100 closes the pressure decreasing linear control valve 65B, thereby shutting off the communication between the main flow passage 52 and the reservoir flow passage 57.

Moreover, as shown in FIG. 11, if the temporal change gradient of the control pressure Px is larger than the magnitude of the leak determination gradient, the leak of the working fluid via the pressure increasing linear control valve 65A or the adjusted flow rate cut valve 66 in which the valve closing operation abnormality occurs is large, and thus the brake ECU 100 cannot appropriately adjust the pressure by using the pressure decreasing linear control valve 65B. Thus, in this case, the brake ECU 100 carries out the brake control in the backup mode (front wheel 2S mode) described below.

Figure 13:
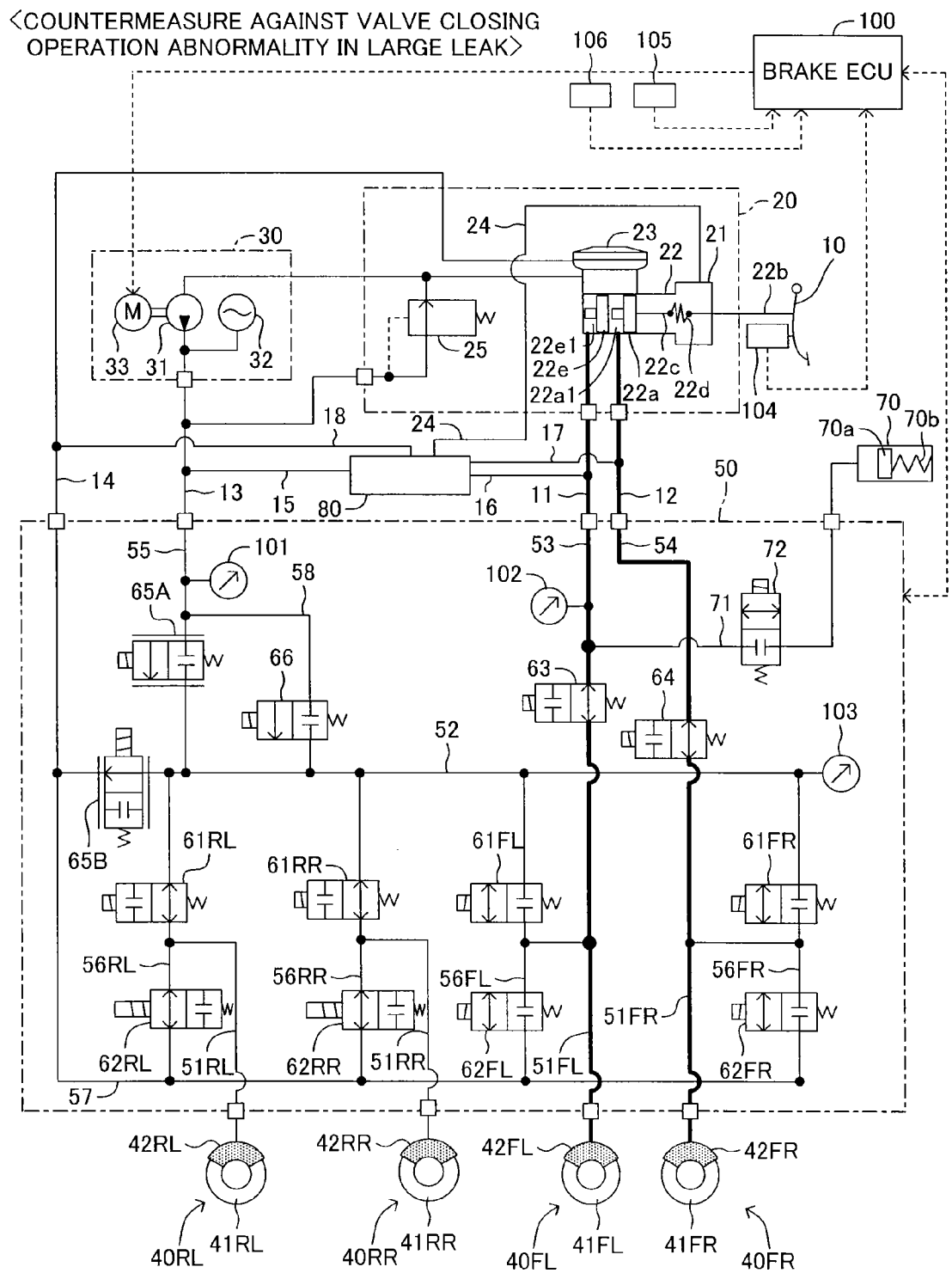
FIG. 13 is a diagram illustrating a countermeasure for a case where the leak of the working fluid caused by the valve closing operation abnormality occurring in the pressure increasing linear control valve or the adjusted flow rate cut valve is large.

Specifically, as illustrated in FIG. 13, in the backup mode carried out when the valve closing operation abnormality occurs, and the leak of the working fluid is large, the brake ECU 100 shuts off the current supplies to the solenoids of the master cut valves 63 and 64 in the closed state to return the master cut valves 63 and 64 to the open state, and shuts off the current supply to the solenoid of the simulator cut valve 72 in the open state to return the simulator cut valve 72 to the closed state. Moreover, the brake ECU 100 shuts off the current supplies to the solenoids of the holding valves 61FR and 61FL in the open state on the front right and left wheel side to return the holding valves 61FR and 61FL to the closed state, and maintains the pressure decreasing valves 62FR and 62FL, which have been in the closed state, in the closed state. As a result, in the backup mode, the wheel cylinders 42FR and 42FL on the front right and left wheel side are shut off from the main flow passage 52, in other words, shut off from the wheel cylinders 42RR and 42RL on the rear right and left wheel side, the wheel cylinder 42FR communicates to the master pressure pipe 11, and the wheel cylinder 42FL communicates to the master pressure pipe 12.

On the other hand, for the rear right and left wheels, the brake ECU 100 maintains the holding valves 61RR and 61RL in the open state, and maintains the pressure decreasing valves 62RR and 62RL in the closed state through the current supplies to the solenoids of the pressure decreasing valves 62RR and 62RL. Moreover, in the backup mode, the brake ECU 100 maintains the pressure increasing linear control valve 65A and the adjusted flow rate cut valve 66 in the closed state, while the brake ECU 100 maintains the pressure decreasing linear control valve 65B in the open state. As a result, the working fluid flowing via the pressure increasing linear control valve 65A or the adjusted flow rate cut valve 66 in which the valve closing operation abnormality occurs to the main flow passage 52 flows via the holding valves 61RR and 61RL and the pressure decreasing valves 62RR and 62RL to the reservoir flow passage 57, and flows via the pressure decreasing linear control valve 65B to the reservoir flow passage 57. As a result, the adjusted accumulator pressure Pacc is not transmitted to the rear right and left wheel cylinders 42RR and 42RL in the backup mode.

Thus, in the brake control in the backup mode, the master cylinder pressure Pmc generated in the master cylinder 22 to which the servo pressure Ps is introduced from the pressure increasing mechanism 80 is supplied respectively to the wheel cylinder 42FR on the front right wheel side and the wheel cylinder 42FL on the front left wheel side. As a result, the braking forces can be generated on the two wheels of the front right and left wheels, thereby preventing an unnecessary yaw behavior from being generated on the vehicle, resulting in securing the appropriate braking forces while behavior stability is secured.

B. Case where Valve Opening Operation Abnormality Occurs in Pressure Increasing Linear Control Valve 65A or Adjusted Flow Rate Cut Valve 66

B-1. Determination of the Absence/Presence of Valve Opening Operation Abnormality As described above, in a case where the braking request is generated through the braking operation by the driver when the brake control is carried out in the linear control mode (4S mode), the brake ECU 100 controls the valve opening degree of the pressure increasing linear control valve 65A through the current supply control. Further, for example, when the brake operation amount by the driver on the brake pedal 10 is large, the brake ECU 100 maintains the adjusted flow rate cut valve 66 in the open state, thereby securing supplied flow rates (volumes) of the working fluid to the respective wheel cylinders 42 to control the control pressure Px to follow the target hydraulic pressure.

In this case, if the valve opening operation abnormality does not occur in the pressure increasing linear control valve 65A or the adjusted flow rate cut valve 66, when the accumulator pressure Pacc is supplied from the accumulator 32 of the power hydraulic pressure generation device 30, the control pressure Px detected by the control pressure sensor 103 communicating to the main flow passage 52 quickly increases. In contrast, for example, if a sticking occurs in a valve portion of the pressure increasing linear control valve 65A or the adjusted flow rate cut valve 66, the valve opening operation abnormality occurs, and even if the accumulator pressure Pacc is supplied from the accumulator 32 of the power hydraulic pressure generation device 30, the control pressure Px detected by the control pressure sensor 103 communicating to the main flow passage 52 does not increase quickly. The brake ECU 100 determines whether or not the valve opening operation abnormality occurs in the pressure increasing linear control valve 65A or the adjusted flow rate cut valve 66 based on those states.

Figure 14:
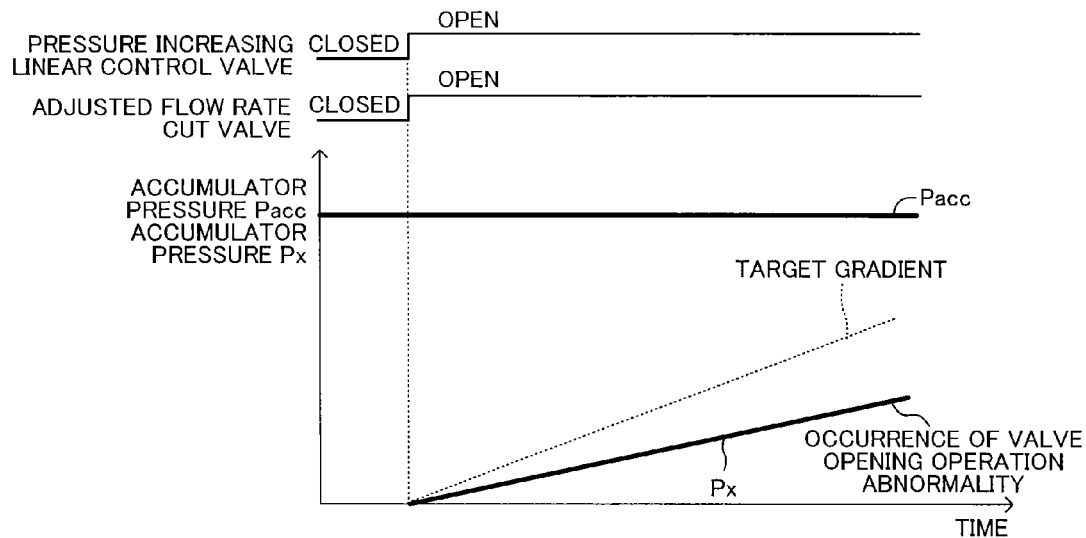
FIG. 14 is a graph showing determination of a valve opening operation abnormality occurring in the pressure increasing linear control valve or the adjusted flow rate cut valve.

Specifically, as shown in FIG. 14, the brake ECU 100 supplies currents to the solenoids of the pressure increasing linear control valve 65A and the adjusted flow rate cut valve 66, thereby controlling the valves to the open state while the accumulator pressure Pacc is supplied from the accumulator 32 of the power hydraulic pressure generation device 30. Then, the brake ECU 100 acquires the control pressure Px from the control pressure sensor 103, and determines whether or not the temporal change gradient of the control pressure Px is less than the target hydraulic pressure gradient set in advance. In other words, the brake ECU 100 brings the pressure increasing linear control valve 65A and the adjusted flow rate cut valve 66 into the open state, and then, if the magnitude of the temporal change gradient of the acquired control pressure Px is less than the target hydraulic pressure gradient, determines that the valve opening operation abnormality occurs in any one of the pressure increasing linear control valve 65A and the adjusted flow rate cut valve 66. On the other hand, the brake ECU 100 brings the pressure increasing linear control valve 65A and the adjusted flow rate cut valve 66 into the open state, and then, if the magnitude of the temporal change gradient of the acquired control pressure Px is equal to or more than the target hydraulic pressure gradient, determines that the valve opening operation abnormality does not occur in both of the pressure increasing linear control valve 65A and the adjusted flow rate cut valve 66.

B-2. Identification of Valve in which Valve Opening Operation Abnormality Occurs As described above, the brake ECU 100 can bring the pressure increasing linear control valve 65A and the adjusted flow rate cut valve 66 into the open state, and can then compare the magnitude of the temporal change gradient of the control pressure Px acquired from the control pressure sensor 103 and the target hydraulic pressure gradient with each other, thereby determining whether the valve opening operation abnormality occurs in the pressure increasing linear control valve 65A or the adjusted flow rate cut valve 66. However, the brake ECU 100 still cannot identify in which one of the pressure increasing linear control valve 65A and the adjusted flow rate cut valve 66 the valve opening operation abnormality occurs only by this determination. Then, the brake ECU 100 identifies in which one of the pressure increasing linear control valve 65A and the adjusted flow rate cut valve 66 the valve opening operation abnormality occurs based on a change in the control pressure Px, more specifically, based on the change in the increasing tendency of the control pressure Px, when the brake ECU 100 sequentially shuts off the current supplies to the solenoids of the respective pressure increasing linear control valve 65A and adjusted flow rate cut valve 66 to bring the valves from the open state to the closed state. A description is now given of the identification.

Figure 15:
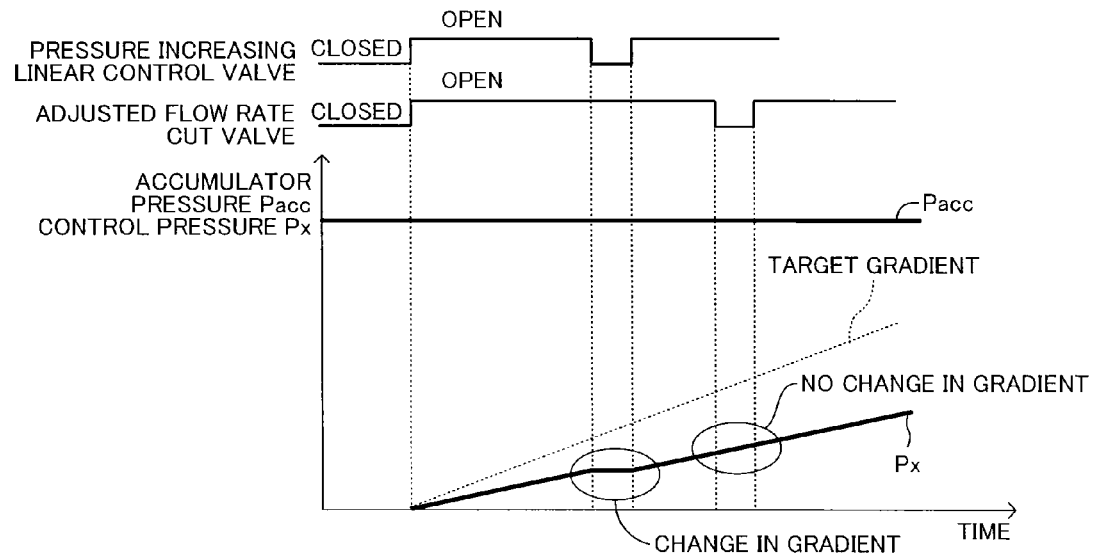
FIG. 15 is a graph showing identification of the valve opening operation abnormality occurring in the adjusted flow rate cut valve by controlling the pressure increasing linear control valve to temporarily be brought in the closed state.

As described above, if the brake ECU 100 determines that the valve opening operation abnormality occurs in the pressure increasing linear control valve 65A or the adjusted flow rate cut valve 66, as shown in FIG. 15, the brake ECU 100 first temporarily shuts off the current supply to the solenoid of the pressure increasing linear control valve 65A, and then again carries out the current supply. Then, the brake ECU 100 temporarily shuts off the current supply to the solenoid of the adjusted flow rate cut valve 66, and then again carries out the current supply.

Figure 16:
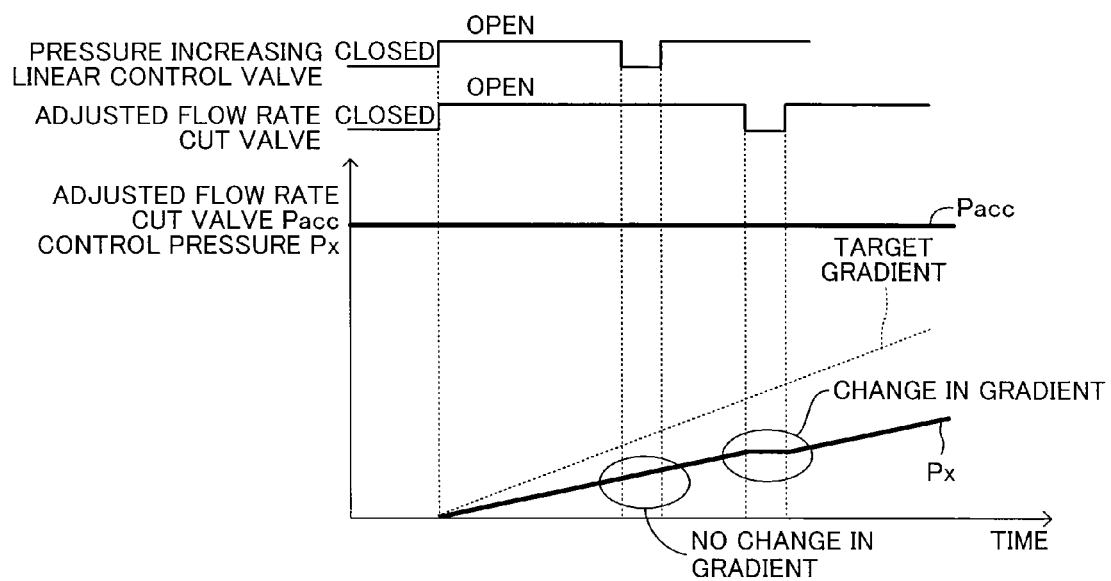
FIG. 16 is a graph showing identification of the valve opening operation abnormality occurring in the pressure increasing linear control valve by controlling the adjusted flow rate cut valve to temporarily be brought in the closed state.

In this way, if the current supply to the solenoid of the pressure increasing linear control valve 65A is temporarily shut off, and thus, as shown in FIG. 15, the magnitude of the temporal change gradient of the control pressure Px acquired from the control pressure sensor 103 changes, in other words, the increasing tendency of the control pressure Px changes, the pressure increasing linear control valve 65A appropriately transitions from the open state to the closed state, and hence the brake ECU 100 determines that the valve opening operation abnormality occurs in the adjusted flow rate cut valve 66. On the other hand, as shown in FIG. 16, if the current supply to the solenoid of the adjusted flow rate cut valve 66 is temporarily shut off, and thus the magnitude of the temporal change gradient of the control pressure Px acquired from the control pressure sensor 103 changes, in other words, the increasing tendency of the control pressure Px changes, the adjusted flow rate cut valve 66 appropriately transitions from the open state to the closed state, and hence the brake ECU 100 determines that the valve opening operation abnormality occurs in the pressure increasing linear control valve 65A.

B-3. Countermeasure Against Occurring Valve Opening Operation Abnormality

Even if the valve opening operation abnormality occurs in the pressure increasing linear control valve 65A or the adjusted flow rate cut valve 66, it is important to generate a braking force required by the brake operation by the driver, namely, a temporal change gradient (this temporal change gradient is hereinafter referred to as "boosting gradient") of the control pressure Px depending on the brake operation. Therefore, if the valve opening operation abnormality occurs in the adjusted flow rate cut valve 66, the brake ECU 100 carries out the brake control adapted to the state (normal state) where the boosting gradient is smaller than the target gradient set in advance and the state (emergency state) where the boosting gradient is larger than the target gradient, and even if the valve opening operation abnormality occurs in the pressure increasing linear control valve 65A, the brake ECU 100 carries out the brake control adapted to the state (normal state) where the boosting gradient is smaller than the target gradient and the state (emergency state) where the boosting gradient is larger than the target gradient. A specific description is now sequentially given of those countermeasures.

Figure 17:
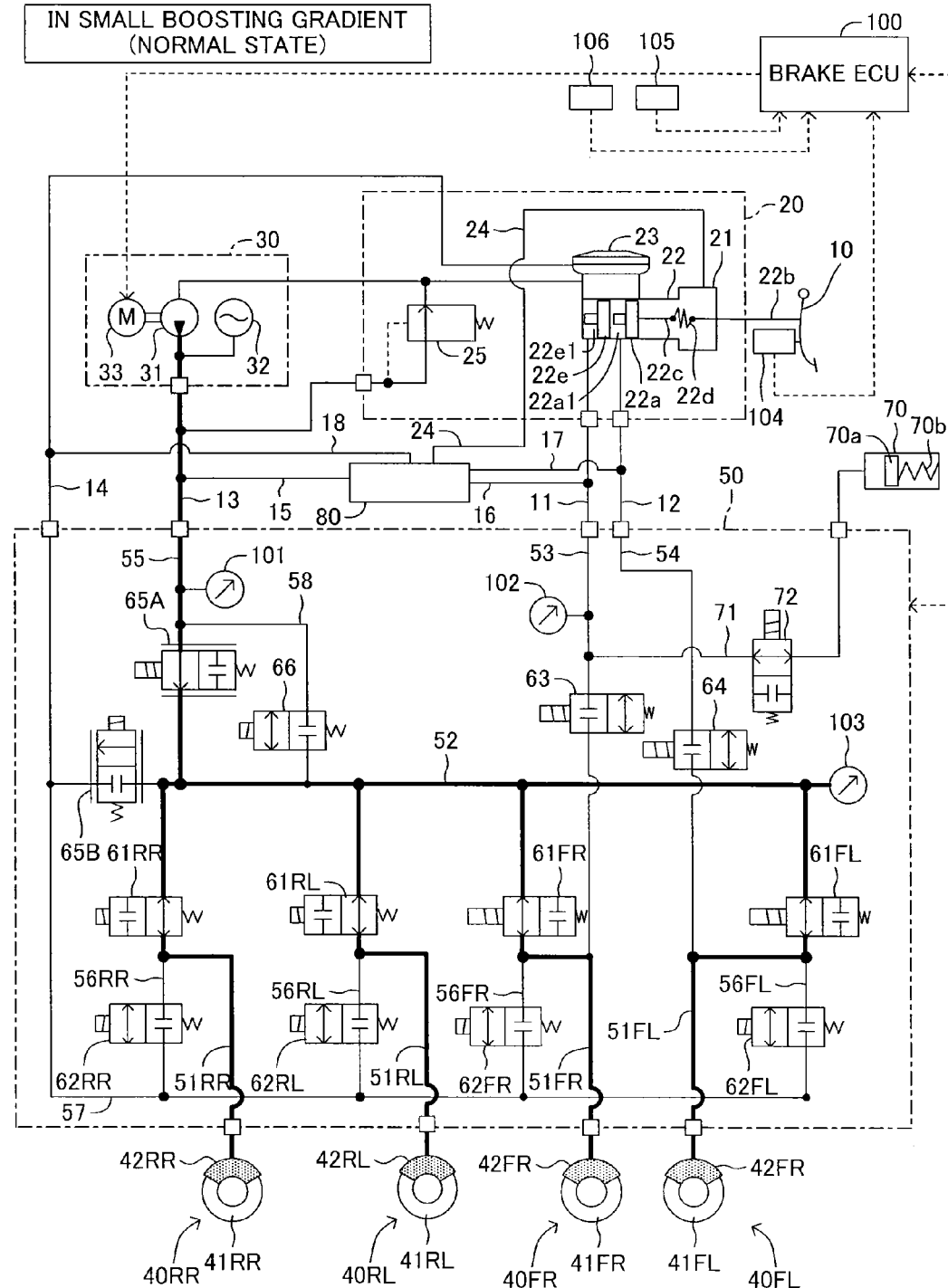
FIG. 17 is a diagram illustrating a countermeasure for a case where the valve opening operation abnormality occurs in the adjusted flow rate cut valve, and a boosting gradient is small.

First, a description is given of the case where the valve opening operation abnormality occurs in the adjusted flow rate cut valve 66, and the boosting gradient is small (normal state). In this case, as illustrated in FIG. 17, the valve opening operation abnormality occurs, and the adjusted flow rate cut valve 66 is thus in the closed state. Therefore, if the brake operation by the driver is gentle, and the boosting gradient is small, the brake ECU 100 transmits the accumulator pressure Pacc adjusted by the pressure increasing linear control valve 65A to the respective wheel cylinders 42 as in the above-mentioned normal linear control mode. In this case, the boosting gradient required by the brake operation is relatively small, and the required boosting gradient can thus be attained by driving only the pressure increasing linear control valve 65A.

Then, a description is given of the case where the valve opening operation abnormality occurs in the adjusted flow rate cut valve 66, and the boosting gradient is large (emergency state). When the driver carries out a quick and large stepping operation on the brake pedal 10 in order to avoid danger, the boosting gradient corresponding to the brake operation is large. Therefore, if the valve opening operation abnormality occurs in the adjusted flow rate cut valve 66, and only the pressure increasing linear control valve 65A is driven, it is difficult to attain the required boosting gradient. Thus, the brake ECU 100 carries out the brake control in the backup mode (front wheel 2S+rear wheel 2S mode) described below.

Figure 18:
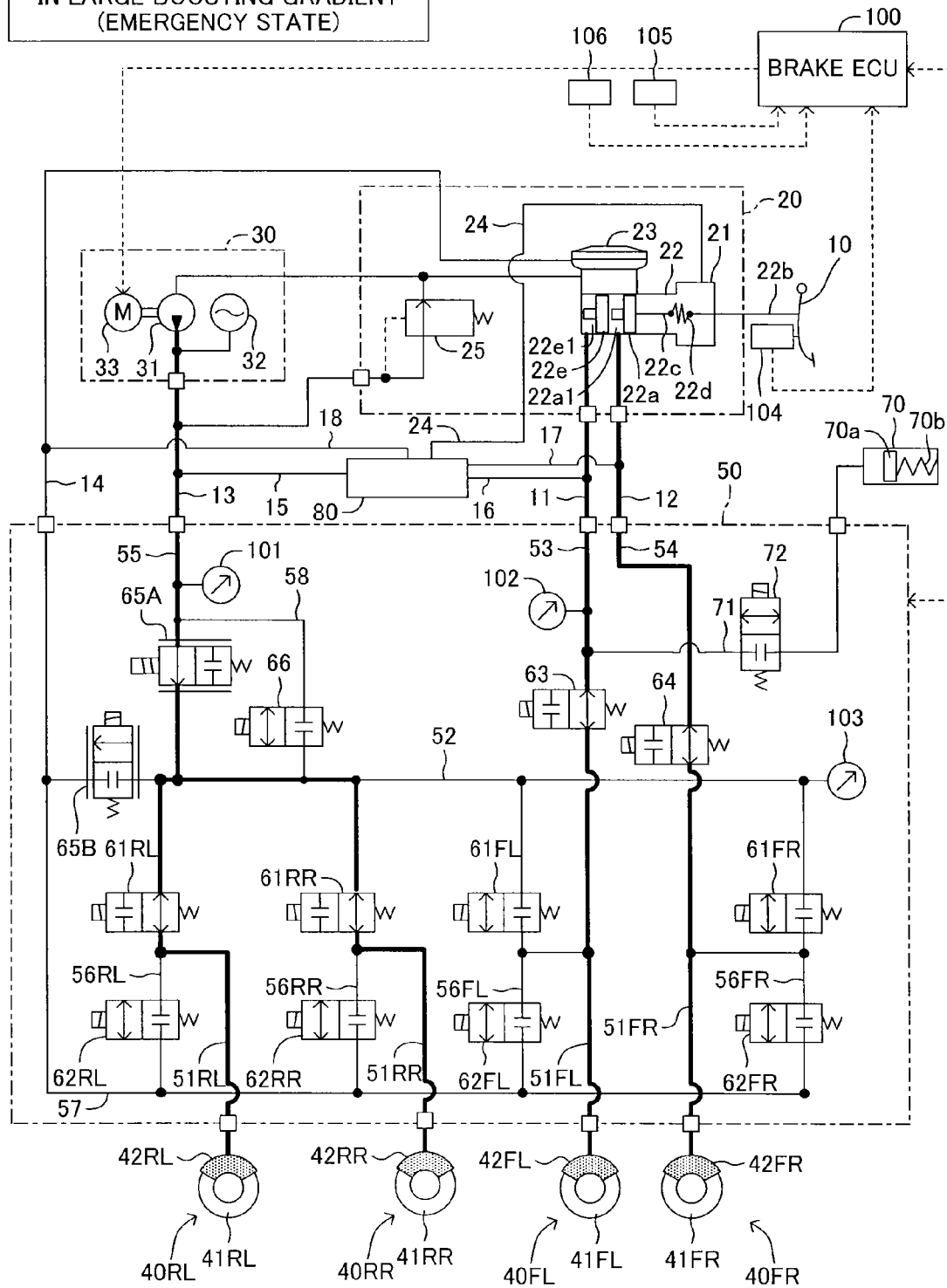
FIG. 18 is a diagram illustrating a countermeasure for a case where the valve opening operation abnormality occurs in the adjusted flow rate cut valve, and the boosting gradient is large.

Specifically, as illustrated in FIG. 18, the brake ECU 100 shuts off the current supplies to the solenoids of the master cut valves 63 and 64 in the closed state to return the master cut valves 63 and 64 to the open state, and shuts off the current supply to the solenoid of the simulator cut valve 72 in the open state to return the simulator cut valve 72 to the closed state. Moreover, the brake ECU 100 shuts off the current supplies to the solenoids of the holding valves 61FR and 61FL in the open state on the front right and left wheel side to return the holding valves 61FR and 61FL to the closed state, and maintains the pressure decreasing valves 62FR and 62FL, which have been in the closed state, in the closed state. As a result, in the backup mode, the wheel cylinders 42FR and 42FL on the front right and left wheel side are shut off from the main flow passage 52, in other words, shut off from the wheel cylinders 42RR and 42RL on the rear right and left wheel side, the wheel cylinder 42FR communicates to the master pressure pipe 11, and the wheel cylinder 42FL communicates to the master pressure pipe 12.

On the other hand, the brake ECU 100 maintains the holding valves 61RR and 61RL in the open state, and maintains the pressure decreasing valves 62RR and 62RL, which have been in the closed state, in the closed state for the rear right and left wheels. Moreover, the brake ECU 100 controls current supply amounts (current values) to the solenoids of the pressure increasing linear control valve 65A and the pressure decreasing linear control valve 65B to continue to control the pressure increasing linear control valve 65A and the pressure decreasing linear control valve 65B to maintain opening degrees corresponding to the current supply amounts. As a result, for the rear right and left wheels in the backup mode, the wheel cylinders 42RR and 42RL communicate to each other via the main flow passage 52. Further, the hydraulic pressure (namely, the accumulator pressure Pacc) output from the power hydraulic pressure generation device 30 is adjusted by the pressure increasing linear control valve 65A and the pressure decreasing linear control valve 65B, and the adjusted hydraulic pressure is transmitted.

Thus, in the brake control in the backup mode, the master cylinder pressure Pmc generated in the master cylinder 22 to which the servo pressure Ps is introduced from the pressure increasing mechanism 80 is supplied respectively to the wheel cylinder 42FR on the front right wheel side and the wheel cylinder 42FL on the front left wheel side. On the other hand, the accumulator pressure Pacc adjusted by the linear control is continuously supplied to the wheel cylinders 42RR and 42RL on the rear right and left wheel side from the power hydraulic pressure generation device 30. As a result, the boosting gradient required by the brake operation by the driver in an emergency state can be attained.

Figure 19:
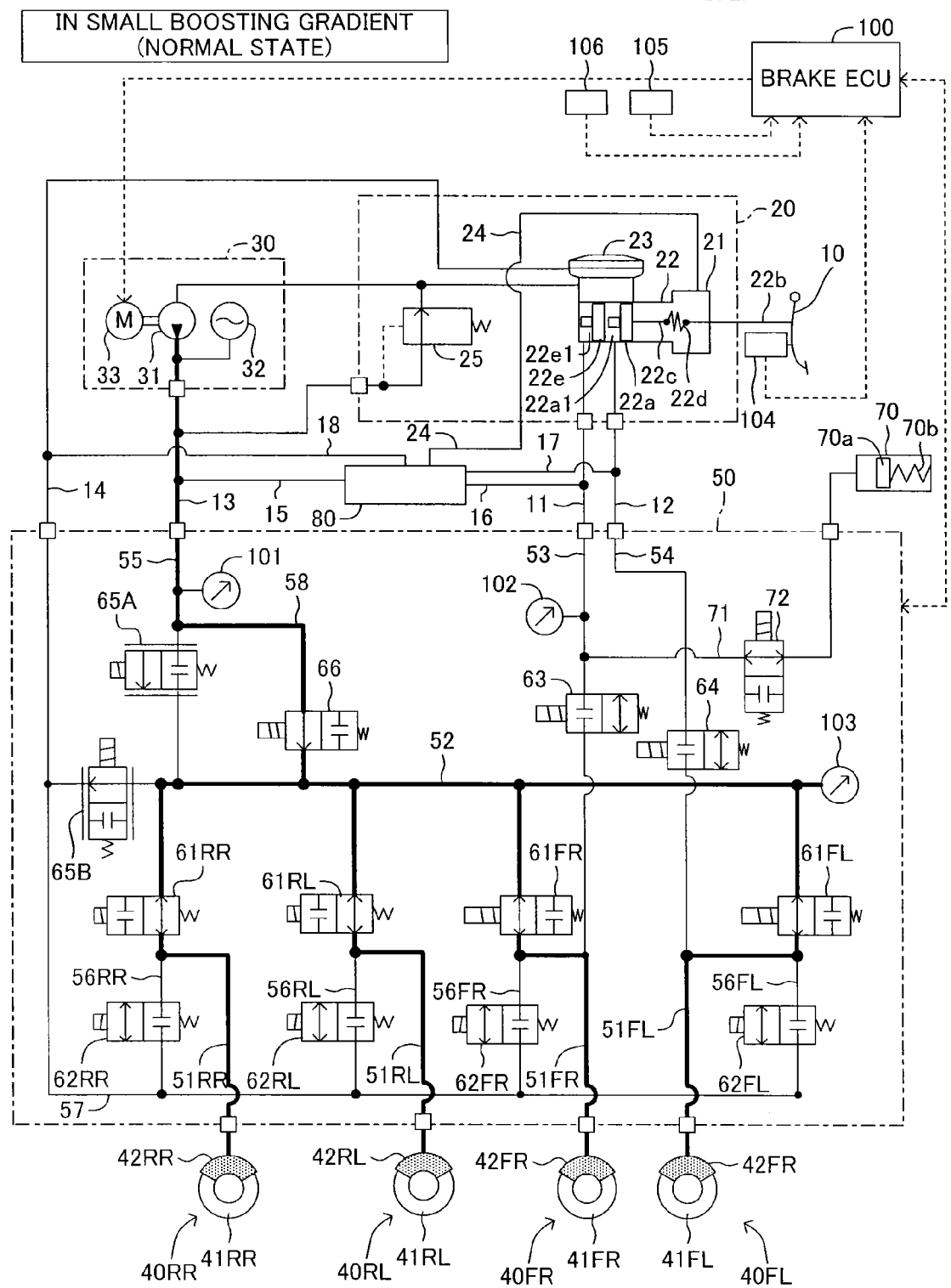
FIG. 19 is a diagram illustrating a countermeasure for a case where the valve opening operation abnormality occurs in the pressure increasing linear control valve, and the boosting gradient is small.

Then, a description is given of the case where the valve opening operation abnormality occurs in the pressure increasing linear control valve 65A, and the boosting gradient is small (normal state). In this case, as illustrated in FIG. 19, the valve opening operation abnormality occurs, and the pressure increasing linear control valve 65A is thus in the closed state. In this case, the brake ECU 100 opens/closes the pressure decreasing linear control valve 65B to appropriately decrease the accumulator pressure Pacc supplied via the adjusted flow rate cut valve 66 for adjustment, which is different from the above-mentioned linear control mode carried out when the pressure increasing linear control valve 65A and the adjusted flow rate cut valve 66 are in the normal state.

Regarding the opening/closing control for the pressure decreasing linear control valve 65B, based on the magnitude of the control pressure Px acquired from the control pressure sensor 103, if the control pressure Px is larger (higher) than the target hydraulic pressure, the brake ECU 100 opens the pressure decreasing linear control valve 65B, thereby controlling the main flow passage 52 and the reservoir flow passage 57 to communicate to each other. On the other hand, based on the magnitude of the control pressure Px acquired from the control pressure sensor 103, if the control pressure Px is appropriate with respect to or smaller (lower) than the target hydraulic pressure, the brake ECU 100 closes the pressure decreasing linear control valve 65B, thereby shutting off the communication between the main flow passage 52 and the reservoir flow passage 57.

Further, a description is given of the case where the valve opening operation abnormality occurs in the pressure increasing linear control valve 65A, and the boosting gradient is large (emergency state). When the driver carries out a quick and large stepping operation on the brake pedal 10 in order to avoid danger, the boosting gradient corresponding to the brake operation is large. Therefore, if the valve opening operation abnormality occurs in the pressure increasing linear control valve 65A, and the adjusted flow rate cut valve 66 and the pressure decreasing linear control valve 65B are driven, it is difficult to attain the required boosting gradient. Thus, the brake ECU 100 carries out the brake control in the backup mode (front wheel 2S+rear wheel 2S mode) described below.

Figure 20:
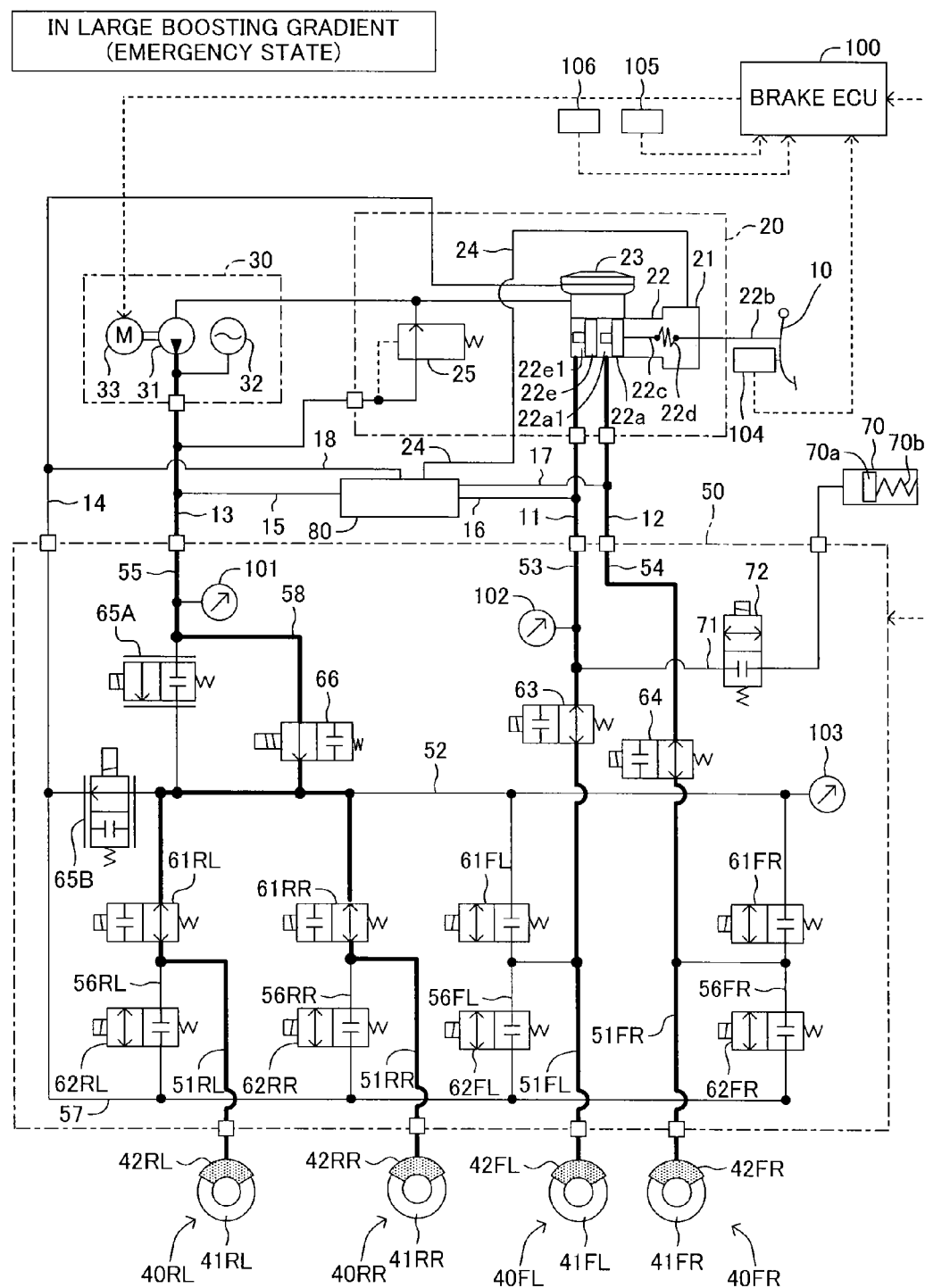
FIG. 20 is a diagram illustrating a countermeasure for a case where the valve opening operation abnormality occurs in the pressure increasing linear control valve, and the boosting gradient is large.

Specifically, as illustrated in FIG. 20, the brake ECU 100 shuts off the current supplies to the solenoids of the master cut valves 63 and 64 in the closed state to return the master cut valves 63 and 64 to the open state, and shuts off the current supply to the solenoid of the simulator cut valve 72 in the open state to return the simulator cut valve 72 to the closed state. Moreover, the brake ECU 100 shuts off the current supplies to the solenoids of the holding valves 61FR and 61FL in the open state on the front right and left wheel side to return the holding valves 61FR and 61FL to the closed state, and maintains the pressure decreasing valves 62FR and 62FL, which have been in the closed state, in the closed state. As a result, also in the backup mode, the wheel cylinders 42FR and 42FL on the front right and left wheel side are shut off from the main flow passage 52, in other words, shut off from the wheel cylinders 42RR and 42RL on the rear right and left wheel side, the wheel cylinder 42FR communicates to the master pressure pipe 11, and the wheel cylinder 42FL communicates to the master pressure pipe 12.

On the other hand, the brake ECU 100 maintains the holding valves 61RR and 61RL in the open state, and maintains the pressure decreasing valves 62RR and 62RL, which have been in the closed state, in the closed state for the rear right and left wheels. Moreover, the brake ECU 100 controls a current supply amount (current value) to the solenoid of the pressure decreasing linear control valve 65B to continue to control the pressure decreasing linear control valve 65B to maintain an opening degree corresponding to the current supply amount. Moreover, the brake ECU 100 maintains the adjusted flow rate cut valve 66 in the open state by the current supply to the solenoid. As a result, for the rear right and left wheels in the backup mode, the wheel cylinders 42RR and 42RL communicate to each other via the main flow passage 52. Further, the hydraulic pressure (namely, the accumulator pressure Pacc) output from the power hydraulic pressure generation device 30 through the adjusted flow rate cut valve 66, is decreased (adjusted) by the pressure decreasing linear control valve 65B, and the decreased hydraulic pressure is transmitted.

Thus, in the brake control in the backup mode, the master cylinder pressure Pmc generated in the master cylinder 22 to which the servo pressure Ps is introduced from the pressure increasing mechanism 80 is supplied respectively to the wheel cylinder 42FR on the front right wheel side and the wheel cylinder 42FL on the front left wheel side. On the other hand, the accumulator pressure Pacc adjusted by the pressure decreasing linear control valve 65B and the adjusted flow rate cut valve 66 is continuously supplied to the wheel cylinders 42RR and 42RL on the rear right and left wheel side from the power hydraulic pressure generation device 30. As a result, the boosting gradient required by the brake operation by the driver in an emergency state can be attained.

As understood from the above description, the valve closing operation abnormality or the valve opening operation abnormality occurring in the pressure increasing linear control valve 65A or the adjusted flow rate cut valve 66 can be accurately determined according to this embodiment. Then, a valve in which the valve closing operation abnormality or the valve opening operation abnormality occurs can accurately be identified based on a change in control pressure Px detected by the control pressure sensor 103 when the pressure increasing linear control valve 65A and the adjusted flow rate cut valve 66 are controlled respectively to the open state or the closed state.

Moreover, the brake control can be appropriately carried out depending on the valve closing operation abnormality or the valve opening operation abnormality occurring in the pressure increasing linear control valve 65A or the electromagnetic on-off valve in accordance with the magnitude of the leak of the working fluid and the magnitude of the boosting gradient. As a result, the accumulator pressure Pacc supplied from the power hydraulic pressure generation device 30 can be maximally used to generate appropriate braking forces on the front and rear right and left wheels.

In carrying out the present invention, the present invention is not limited to the above-mentioned embodiment, and different kinds of changes can be made thereto without departing from an object of the present invention.

For example, in the above-mentioned embodiment, the present invention is carried out on the assumption that the hydraulic pressure booster 21 is a hydro booster which uses the servo pressure Ps (hydraulic pressure) supplied from the pressure increasing mechanism 80 which mechanically operates. In this case, any pressure increasing mechanism can be employed as long as the pressure increasing mechanism is capable of introducing the servo pressure Ps into the neighborhood of the stroke adjustment spring 22d for coupling the first piston rod 22b and the second piston rod 22c of the master cylinder 22 to each other, thereby appropriately boosting (amplifying) the stepping force F input by the driver via the brake pedal 10.

Further, the embodiment is carried out so that the pressure increasing mechanism 80 supplies the hydraulic pressure booster 21 with the servo pressure Ps. In this case, for example, such an embodiment that the servo pressure Ps is supplied from the power hydraulic pressure generation device 30 to the hydraulic pressure booster is possible. Further in this case, the driver can acquire appropriate brake operation feeling as in the embodiment.

The invention claimed is:

1. A vehicle brake device, comprising:
a wheel cylinder for receiving a hydraulic pressure of a working fluid and applying a braking force to a wheel;
a master cylinder for introducing therein a servo pressure generated in response to an operation by a driver on a brake pedal, thereby generating a hydraulic pressure;
a power hydraulic pressure source for generating a hydraulic pressure by drive of a pressurizing pump;
a pressure adjustment control valve for adjusting the hydraulic pressure transmitted from the power hydraulic pressure source to the wheel cylinder;
first hydraulic pressure detection means for detecting the hydraulic pressure output from the power hydraulic pressure source;
second hydraulic pressure detection means for detecting the hydraulic pressure output from the master cylinder;
third hydraulic pressure detection means for detecting the hydraulic pressure output via the pressure adjustment control valve and transmitted to the wheel cylinder; and
a control unit for controlling drive of the power hydraulic pressure source and drive of the pressure adjustment control valve based on the hydraulic pressure output from the master cylinder and detected by the second hydraulic pressure detection means, and the hydraulic pressure transmitted to the wheel cylinder and detected by the third hydraulic pressure detection means, wherein:
the pressure adjustment control valve comprises: a pressure increasing linear control valve used for pressure increasing control of increasing the hydraulic pressure transmitted from the power hydraulic pressure source to the wheel cylinder; an electromagnetic on-off valve arranged in parallel to the pressure increasing linear control valve; and a pressure decreasing linear control valve used for pressure decreasing control of decreasing the hydraulic pressure transmitted from the power hydraulic pressure source to the wheel cylinder; and
the control unit is programmed to:
use, when a magnitude of the hydraulic pressure detected by the first hydraulic pressure detection means is a predetermined magnitude, a magnitude of the hydraulic pressure detected by the third hydraulic pressure detection means to determine whether or not an operation abnormality occurs in one of the pressure increasing linear control valve and the electromagnetic on-off valve that construct the pressure adjustment control valve;
control, when the control unit determines that the operation abnormality occurs in one of the pressure increasing linear control valve and the electromagnetic on-off valve, each of the pressure increasing linear control valve and the electromagnetic on-off valve to change from a closed state to an open state or from the open state to the closed state; and
identify, based on a change in the hydraulic pressure generated in response to the change control and detected by the third hydraulic pressure detection means, in which of the pressure increasing linear control valve and the electromagnetic on-off valve the operation abnormality occurs,
wherein the control unit is programmed to:
determine, in a case where the control unit controls the pressure increasing linear control valve and the electromagnetic on-off valve to the closed state when the magnitude of the hydraulic pressure detected by the first hydraulic pressure detection means is the predetermined magnitude, and the magnitude of the hydraulic pressure detected by the third hydraulic pressure detection means increases, that a valve closing operation abnormality occurs in which the open state is maintained even when the change control of bringing one of the pressure increasing linear control valve and the electromagnetic on-off valve from the open state into the closed state is carried out; and
determine, in a case where the control unit controls the pressure increasing linear control valve and the electromagnetic on-off valve to the open state when the magnitude of the hydraulic pressure detected by the first hydraulic pressure detection means is the predetermined magnitude, and the magnitude of the hydraulic pressure detected by the third hydraulic pressure detection means is less than a magnitude of a target hydraulic pressure, that a valve opening operation abnormality occurs in which the closed state is maintained even when the change control of bringing one of the pressure increasing linear control valve and the electromagnetic on-off valve from the closed state into the open state is carried out,
and wherein the control unit is further programmed to, when the control unit determines that the valve closing operation abnormality occurs in one of the pressure increasing linear control valve and the electromagnetic on-off valve:
control the pressure increasing linear control valve from the closed state to the open state, and control the electromagnetic on-off valve to the closed state;
identify, in a case where the magnitude of the hydraulic pressure detected by the third hydraulic pressure detection means is a magnitude of the hydraulic pressure transmitted from the power hydraulic pressure source to the wheel cylinder when only the pressure increasing linear control valve is controlled to the open state, that the valve closing operation abnormality occurs in the pressure increasing linear control valve; and
identify, in a case where the magnitude of the hydraulic pressure detected by the third hydraulic pressure detection means is larger than the magnitude of the hydraulic pressure transmitted from the power hydraulic pressure source to the wheel cylinder when only the pressure increasing linear control valve is contra lied to the open state, that the valve closing operation abnormality occurs in the electromagnetic on-off valve.

2. A vehicle brake device, comprising:
a wheel cylinder for receiving a hydraulic pressure of a working fluid and applying a braking force to a wheel;
a master cylinder for introducing therein a servo pressure generated in response to an operation by a driver on a brake pedal, thereby generating a hydraulic pressure;

a power hydraulic pressure source for generating a hydraulic pressure by drive of a pressurizing pump;

a pressure adjustment control valve for adjusting the hydraulic pressure transmitted from the power hydraulic pressure source to the wheel cylinder;

first hydraulic pressure detection means for detecting the hydraulic pressure output from the power hydraulic pressure source;

second hydraulic pressure detection means for detecting the hydraulic pressure output from the master cylinder;

third hydraulic pressure detection means for detecting the hydraulic pressure output via the pressure adjustment control valve and transmitted to the wheel cylinder; and a control unit for controlling drive of the power hydraulic pressure source and drive of the pressure adjustment control valve based on the hydraulic pressure output from the master cylinder and detected by the second hydraulic pressure detection means, and the hydraulic pressure transmitted to the wheel cylinder and detected by the third hydraulic pressure detection means, wherein:

the pressure adjustment control valve comprises: a pressure increasing linear control valve used for pressure increasing control of increasing the hydraulic pressure transmitted from the power hydraulic pressure source to the wheel cylinder: an electromagnetic on-off valve arranged in parallel to the pressure increasing linear control valve: and a pressure decreasing linear control valve used for pressure decreasing control of decreasing the hydraulic pressure transmitted from the power hydraulic pressure source to the wheel cylinder: and the control unit is programmed to:

use, when a magnitude of the hydraulic pressure detected by the first hydraulic pressure detection means is a predetermined magnitude, a magnitude of the hydraulic pressure detected by the third hydraulic pressure detection means to determine whether or not an operation abnormality occurs in one of the pressure increasing linear control valve and the electromagnetic on-off valve that construct the pressure adjustment control valve;

control, when the control unit determines that the operation abnormality occurs in one of the pressure increasing linear control valve and the electromagnetic on-off valve, each of the pressure increasing linear control valve and the electromagnetic on-off valve to change from a closed state to an open state or from the open state to the closed state; and identify, based on a change in the hydraulic pressure generated in response to the change control and detected by the third hydraulic pressure detection means, in which of the pressure increasing linear control valve and the electromagnetic on-off valve the operation abnormality occurs, wherein the control unit is programmed to:

determine, in a case where the control unit controls the pressure increasing linear control valve and the electromagnetic on-off valve to the closed state when the magnitude of the hydraulic pressure detected by the first hydraulic pressure detection means is the predetermined magnitude, and the magnitude of the hydraulic pressure detected by the third hydraulic pressure detection means increases, that a valve closing operation abnormality occurs in which the open state is maintained even when the change control of bringing one of the pressure increasing linear control valve and the electromagnetic on-off valve from the open state into the closed state is carried out; and determine, in a case where the control unit controls the pressure increasing linear control valve and the electromagnetic on-off valve to the open state when the magnitude of the hydraulic pressure detected by the first hydraulic pressure detection means is the predetermined magnitude, and the magnitude of the hydraulic pressure detected by the third hydraulic pressure detection means is less than a magnitude of a target hydraulic pressure, that a valve opening operation abnormality occurs in which the closed state is maintained even when the change control of bringing one of the pressure increasing linear control valve and the electromagnetic on-off valve from the closed state into the open state is carried out, and wherein the control unit is further programmed to, when the control unit determines that the valve closing operation abnormality occurs in one of the pressure increasing linear control valve and the electromagnetic on-off valve:

control the electromagnetic on-off valve from the closed state to the open state, and control the pressure increasing linear control valve to the closed state;

identify, in a case where the magnitude of the hydraulic pressure detected by the third hydraulic pressure detection means is a magnitude of the hydraulic pressure transmitted from the power hydraulic pressure source to the wheel cylinder when only the electromagnetic on-off valve is controlled to the open state, that the valve closing operation abnormality occurs in the electromagnetic on-off valve; and identify, in a case where the magnitude of the hydraulic pressure detected by the third hydraulic pressure detection means is larger than the magnitude of the hydraulic pressure transmitted from the power hydraulic pressure source to the wheel cylinder when only the electromagnetic on-off valve is controlled to the open state, that the valve closing operation abnormality occurs in the pressure increasing linear control valve.

3. A vehicle brake device, comprising:

a wheel cylinder for receiving a hydraulic pressure of a working fluid and applying a braking force to a wheel;

a master cylinder for introducing therein a servo pressure generated in response to an operation by a driver on a brake pedal, thereby generating a hydraulic pressure;

a power hydraulic pressure source for generating a hydraulic pressure by drive of a pressurizing pump;

a pressure adjustment control valve for adjusting the hydraulic pressure transmitted from the power hydraulic pressure source to the wheel cylinder;

first hydraulic pressure detection means for detecting the hydraulic pressure output from the power hydraulic pressure source;

second hydraulic pressure detection means for detecting the hydraulic pressure output from the master cylinder;

third hydraulic pressure detection means for detecting the hydraulic pressure output via the pressure adjustment control valve and transmitted to the wheel cylinder; and a control unit for controlling drive of the power hydraulic pressure source and drive of the pressure adjustment control valve based on the hydraulic pressure output from the master cylinder and detected by the second hydraulic pressure detection means, and the hydraulic pressure transmitted to the wheel cylinder and detected by the third hydraulic pressure detection means, wherein:

the pressure adjustment control valve comprises: a pressure increasing linear control valve used for pressure increasing control of increasing the hydraulic pressure transmitted from the power hydraulic pressure source to the wheel cylinder; an electromagnetic on-off valve arranged in parallel to the pressure increasing linear control valve; and a pressure decreasing linear control valve used for pressure decreasing control of decreasing the hydraulic pressure transmitted from the power hydraulic pressure source to the wheel cylinder; and the control unit is programmed to:
 use, when a magnitude of the hydraulic pressure detected by the first hydraulic pressure detection means is a predetermined magnitude, a magnitude of the hydraulic pressure detected by the third hydraulic pressure detection means to determine whether or not an operation abnormality occurs in one of the pressure increasing linear control valve and the electromagnetic on-off valve that construct the pressure adjustment control valve;
 control, when the control unit determines that the operation abnormality occurs in one of the pressure increasing linear control valve and the electromagnetic on-off valve, each of the pressure increasing linear control valve and the electromagnetic on-off valve to change from a closed state to an open state or from the open state to the closed state; and
 identify, based on a change in the hydraulic pressure generated in response to the change control and detected by the third hydraulic pressure detection means, in which of the pressure increasing linear control valve and the electromagnetic on-off valve the operation abnormality occurs, wherein the control unit is programmed to:
 determine, in a case where the control unit controls the pressure increasing linear control valve and the electromagnetic on-off valve to the closed state when the magnitude of the hydraulic pressure detected by the first hydraulic pressure detection means is the predetermined magnitude, and the magnitude of the hydraulic pressure detected by the third hydraulic pressure detection means increases, that a valve closing operation abnormality occurs in which the open state is maintained even when the change control of bringing one of the pressure increasing linear control valve and the electromagnetic on-off valve from the open state into the closed state is carried out; and
 determine, in a case where the control unit controls the pressure increasing linear control valve and the electromagnetic on-off valve to the open state when the magnitude of the hydraulic pressure detected by the first hydraulic pressure detection means is the predetermined magnitude, and the magnitude of the hydraulic pressure detected by the third hydraulic pressure detection means is less than a magnitude of a target hydraulic pressure, that a valve opening operation abnormality occurs in which the closed state is maintained even when the change control of bringing one of the pressure increasing linear control valve and the electromagnetic on-off valve from the closed state into the open state is carried out, and wherein the control unit is further programmed to, when the control unit determines that the valve opening operation abnormality occurs in one of the pressure increasing linear control valve and the electromagnetic on-off valve:
 control the pressure increasing linear control valve from the open state to the closed state, and control the electromagnetic on-off valve to the open state; and
 identify, when the magnitude of the hydraulic pressure detected by the third hydraulic pressure detection means changes from an increase tendency in response to the control of bringing the pressure increasing linear control valve into the closed state, that the valve opening operation abnormality occurs in the electromagnetic on-off valve.

4. A vehicle brake device, comprising:
a wheel cylinder for receiving a hydraulic pressure of a working fluid and applying a braking force to a wheel;
a master cylinder for introducing therein a servo pressure generated in response to an operation by a driver on a brake pedal, thereby generating a hydraulic pressure;
a power hydraulic pressure source for generating a hydraulic pressure by drive of a pressurizing pump;
a pressure adjustment control valve for adjusting the hydraulic pressure transmitted from the power hydraulic pressure source to the wheel cylinder;
first hydraulic pressure detection means for detecting the hydraulic pressure output from the power hydraulic pressure source;
second hydraulic pressure detection means for detecting the hydraulic pressure output from the master cylinder;
third hydraulic pressure detection means for detecting the hydraulic pressure output via the pressure adjustment control valve and transmitted to the wheel cylinder; and
a control unit for controlling drive of the power hydraulic pressure source and drive of the pressure adjustment control valve based on the hydraulic pressure output from the master cylinder and detected by the second hydraulic pressure detection means, and the hydraulic pressure transmitted to the wheel cylinder and detected by the third hydraulic pressure detection means, wherein:

the pressure adjustment control valve comprises: a pressure increasing linear control valve used for pressure increasing control of increasing the hydraulic pressure transmitted from the power hydraulic pressure source to the wheel cylinder; an electromagnetic on-off valve arranged in parallel to the pressure increasing linear control valve; and
a pressure decreasing linear control valve used for pressure decreasing control of decreasing the hydraulic pressure transmitted from the power hydraulic pressure source to the wheel cylinder; and the control unit is programmed to:
 use, when a magnitude of the hydraulic pressure detected by the first hydraulic pressure detection means is a predetermined magnitude, a magnitude of the hydraulic pressure detected by the third hydraulic pressure detection means to determine whether or not an operation abnormality occurs in one of the pressure increasing linear control valve and the electromagnetic on-off valve that construct the pressure adjustment control valve;
 control, when the control unit determines that the operation abnormality occurs in one of the pressure increasing linear control valve and the electromagnetic on-off valve, each of the pressure increasing linear control valve and the electromagnetic on-off valve to change from a closed state to an open state or from the open state to the closed state; and identify, based on a change in the hydraulic pressure generated in response to the change control and detected by the third hydraulic pressure detection means, in which of the pressure increasing linear control valve and the electromagnetic on-off valve the operation abnormality occurs, wherein the control unit is programmed to:

determine, in a case where the control unit controls the pressure increasing linear control valve and the electromagnetic on-off valve to the closed state when the magnitude of the hydraulic pressure detected by the first hydraulic pressure detection means is the predetermined magnitude, and the magnitude of the hydraulic pressure detected by the third hydraulic pressure detection means increases, that a valve closing operation abnormality occurs in which the open state is maintained even when the change control of bringing one of the pressure increasing linear control valve and the electromagnetic on-off valve from the open state into the closed state is carried out; and determine, in a case where the control unit controls the pressure increasing linear control valve and the electromagnetic on-off valve to the open state when the magnitude of the hydraulic pressure detected by the first hydraulic pressure detection means is the predetermined magnitude, and the magnitude of the hydraulic pressure detected by the third hydraulic pressure detection means is less than a magnitude of a target hydraulic pressure, that a valve opening operation abnormality occurs in which the closed state is maintained even when the change control of bringing one of the pressure increasing linear control valve and the electromagnetic on-off valve from the closed state into the open state is carried out, and wherein the control unit is further programmed to, when the control unit determines that the valve opening operation abnormality occurs in one of the pressure increasing linear control valve and the electromagnetic on-off valve;

control the electromagnetic on-off valve from the open state to the closed state, and control the pressure increasing linear control valve to the open state; and identify, when the magnitude of the hydraulic pressure detected by the third hydraulic pressure detection means changes from an increase tendency in response to the control of bringing the electromagnetic on-off valve into the closed state, that the valve opening operation abnormality occurs in the pressure increasing linear control valve.

* * * * *